US010712939B2

(12) United States Patent
Harada et al.

(10) Patent No.: US 10,712,939 B2
(45) Date of Patent: Jul. 14, 2020

(54) CONTROL METHOD OF INFORMATION DEVICE FOR MANAGING ELECTRIC POWER CONSUMPTION OF DEVICES IN INCREMENTS OF BRANCH CIRCUITS

(71) Applicant: Panasonic Intellectual Property Corporation of America, Torrance, CA (US)

(72) Inventors: Kumi Harada, Osaka (JP); Akiko Takamiya, Osaka (JP); Kahoru Iai, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 289 days.

(21) Appl. No.: 15/406,833

(22) Filed: Jan. 16, 2017

(65) Prior Publication Data
US 2017/0123652 A1 May 4, 2017

Related U.S. Application Data

(63) Continuation of application No. PCT/JP2015/005885, filed on Nov. 27, 2015.
(Continued)

(51) Int. Cl.
*G06F 3/0488* (2013.01)
*G05B 15/02* (2006.01)
(Continued)

(52) U.S. Cl.
CPC ......... *G06F 3/04886* (2013.01); *G05B 15/02* (2013.01); *G06F 3/0484* (2013.01);
(Continued)

(58) Field of Classification Search
CPC ...... G06F 3/048; H04L 12/6468; G05B 15/02
See application file for complete search history.

(56) References Cited

U.S. PATENT DOCUMENTS 6,243,724 B1 * 6/2001 Mander ................. G06F 3/0483
707/E17.008
8,587,545 B2 * 11/2013 Kasahara ............ G06F 3/04883
345/173
(Continued)

FOREIGN PATENT DOCUMENTS

JP 2000-138979 5/2000
JP 2011-120428 6/2011
(Continued)

OTHER PUBLICATIONS

International Search Report of PCT application No. PCT/JP2015/005885 dated Dec. 28, 2015.
(Continued)

*Primary Examiner* — Li P Sun
*Assistant Examiner* — Qi Wan
(74) *Attorney, Agent, or Firm* — Greenblum & Bernstein, P.L.C.

(57) ABSTRACT

An information device has a display and is connected to a distribution board system including multiple branch circuits including a first branch circuit to which devices are correlated, and manages electric power consumption by branch circuits. A control method thereof includes: acquiring state information indicating electric power consumption of each branch circuit; displaying multiple display objects corresponding to multiple devices correlated with the first branch circuit, overlapped, and displaying an electric power display indicating electric power consumption of the first branch circuit over the overlapped multiple display objects; if the overlapped multiple display objects are tapped on, displaying these separated, and displaying device displays representing each device at each separated multiple display object; and if any one of the separated multiple display objects on the display is tapped on, displaying the separated display objects overlapped, and erasing the device displays
(Continued)

representing the devices from the overlapped multiple display objects.

19 Claims, 25 Drawing Sheets

Related U.S. Application Data

(60) Provisional application No. 62/135,363, filed on Mar. 19, 2015.

(51) Int. Cl.
*H04L 12/46* (2006.01)
*H04Q 9/00* (2006.01)
*H04M 11/00* (2006.01)
*H04L 12/28* (2006.01)
*G06F 3/0484* (2013.01)

(52) U.S. Cl.
CPC ...... *H04L 12/2803* (2013.01); *H04L 12/2816* (2013.01); *H04L 12/2823* (2013.01); *H04L 12/4625* (2013.01); *H04M 11/00* (2013.01); *H04Q 9/00* (2013.01)

(56) References Cited

U.S. PATENT DOCUMENTS

| | | | | |
|---|---|---|---|---|
| 9,496,005 | B2* | 11/2016 | Minamino | G11B 27/34 |
| 2003/0048309 | A1* | 3/2003 | Tambata | G01C 21/3664 |
| | | | | 715/810 |
| 2007/0035513 | A1* | 2/2007 | Sherrard | G06F 3/04817 |
| | | | | 345/157 |
| 2009/0138815 | A1* | 5/2009 | Mercer | G06F 3/0485 |
| | | | | 715/786 |
| 2012/0026113 | A1* | 2/2012 | Kasahara | G06F 3/0482 |
| | | | | 345/173 |
| 2013/0088518 | A1* | 4/2013 | Lemmey | G06F 3/0486 |
| | | | | 345/661 |
| 2015/0143249 | A1* | 5/2015 | Sasaki | H04L 12/6418 |
| | | | | 715/740 |
| 2015/0153924 | A1* | 6/2015 | Felt | G06F 3/0482 |
| | | | | 715/765 |
| 2015/0186397 | A1* | 7/2015 | Cueto | G06F 17/30126 |
| | | | | 715/854 |
| 2015/0261427 | A1* | 9/2015 | Sasaki | G06F 3/04817 |
| | | | | 715/736 |

FOREIGN PATENT DOCUMENTS

| | | |
|---|---|---|
| JP | 2013-525878 | 6/2013 |
| JP | 2013-218419 | 10/2013 |
| WO | 2011/126501 | 10/2011 |
| WO | 2015/008408 | 1/2015 |

OTHER PUBLICATIONS

Nobuki Goto, "Home Energy Monitoring System", technical report, vol. 19, No. 9, ISSN0918-7510, pp. 53-56, Sep. 2010.

* cited by examiner

| BRANCH CIRCUIT ID (1501) | BRANCH CIRCUIT NAME (1502) | DISPLAY PRIORITY ORDER (1503) | NUMBER-OF-REGISTERED-DEVICES (1504) |
|---|---|---|---|
| 1 | AIR CONDITIONER | 3 | 1 |
| 2 | LIVING ROOM | 1 | 2 |
| 3 | KITCHEN | 2 | 3 |
| ... | | | |

| BRANCH CIRCUIT ID (1601) | DEVICE ID (1602) | DEVICE NAME (1603) |
|---|---|---|
| 1 | A | AIR CONDITIONER |
| 2 | K | TELEVISION |
| 2 | L | RECORDER |
| 3 | D | RICE COOKER |
| 3 | E | MICROWAVE OVEN |
| 3 | G | REFRIGERATOR |
| ... | | |

| DISTRIBUTION BOARD ID (1701) | INFORMATION DEVICE ID (1702) | INFORMATION DEVICE TYPE (1703) |
|---|---|---|
| 1 | A | PC |
| 1 | B | SMARTPHONE 1 |
| 1 | C | SMARTPHONE 2 |
| 2 | A | TABLET |
| ... | ... | ... |

| BRANCH CIRCUIT ID (1801) | DATE (1802) | TIME (1803) | ELECTRIC POWER CONSUMPTION (1804) |
|---|---|---|---|
| 1 | 1/16/2014 | 0:00 | 0 kWh |
| 1 | 1/16/2014 | 0:30 | 25 kWh |
| 1 | 1/16/2014 | 1:00 | 18 kWh |
| ... | | | |

| BRANCH CIRCUIT ID | DATE | TIME | ELECTRIC POWER CONSUMPTION |
|---|---|---|---|
| n | 1/16/2014 | 0:00 | 50 kWh |
| n | 1/16/2014 | 0:30 | 0 kWh |
| n | 1/16/2014 | 1:00 | 0 kWh |
| ... | | | |

| BRANCH CIRCUIT ID | OPERATIONAL STATE |
|---|---|
| 1 | OFF |
| 2 | ON |
| 3 | ON |
| ... | |

| OPERATIONAL STATE (2101) | ACTION (2102) | COLOR (2103) | SIZE INDEX (2104) |
|---|---|---|---|
| ON | OPERATING | GREEN | 2 |
| OFF | STOPPED | GRAY | — |

CONTROL METHOD OF INFORMATION DEVICE FOR MANAGING ELECTRIC POWER CONSUMPTION OF DEVICES IN INCREMENTS OF BRANCH CIRCUITS

BACKGROUND

1. Technical Field

The present invention relates to a control method of an information device, a program, and an information device.

2. Description of the Related Art

There has been proposed a technology in which one or more devices of interest are remotely monitored using one remote controller. Japanese Unexamined Patent Application Publication No. 2000-138979 discloses a technology in which one or more devices of interest are remotely controlled using a single remote controller. Specifically, a layout of rooms and states within the rooms are displayed on a liquid crystal monitor of a remote controller. The liquid crystal monitor displays, for example, a lighting mark that is displayed on a case where a lighting device in a certain room is on, a room temperature mark indicating the current temperature in a certain room, a locked mark where a window is hatched in a case where the window of a certain room is locked, a device/equipment make indicating the state and so forth of objects to be controlled, a mark indicating the amount of water in the bathtub in a case where the object of control is the bathtub, and so forth (paragraphs [0037] through [0041] and FIG. 6 of Japanese Unexamined Patent Application Publication No. 2000-138979). However, the above-described Japanese Unexamined Patent Application Publication No. 2000-138979 has needed further improvement.

SUMMARY

In one general aspect, the techniques disclosed here feature a control method of an information device that has a touch-panel display and is connected via a network to a distribution board system including a plurality of branch circuits including a first branch circuit to which two or more devices of interest have been correlated, and manages electric power consumption in increments of branch circuits. The control method includes: acquiring state information, indicating electric power consumption in increments of branch circuits, from the distribution board system via the network; displaying on the display two or more display objects corresponding to each of two or the more devices of interest correlated with the first branch circuit, in an overlapped state, and also displaying an electric power display indicating electric power consumption corresponding to the first branch circuit, in a manner overlapping on the overlapped two or more display objects; in a case where an operation of tapping the overlapped two or more display objects is detected at the overlapped two or more display objects, displaying the overlapped two or more display objects in a separated manner, and displaying a device display representing each of the two or more devices of interest correlated with the first branch circuit, at each of the separated two or more display objects; and in a case where an operation of tapping any one of the separated two or more display objects on the display is detected, displaying the separated two or more display objects in an overlapped manner, and erasing the device display representing each of the two or more devices of interest correlated with the first branch circuit from each of the overlapped two or more display objects.

According to the above aspect, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 15 is a diagram schematically illustrating an example of the configuration of a branch circuit list saved in the storage unit of the server;

FIG. 16 is a diagram schematically illustrating an example of the configuration of a device list saved in the storage unit of the server;

FIG. 17 is a diagram schematically illustrating an example of the configuration of an information device list saved in the storage unit of the server;

FIG. 18 is a diagram schematically illustrating an example of the configuration of electric power consumption information saved in the storage unit of the server;

FIG. 19 is a diagram schematically illustrating an example of the configuration of electric power consumption information saved in the storage unit of the server;

FIG. 20 is a diagram schematically illustrating an example of the configuration of device state information saved in the storage unit of the server;

FIG. 21 is a diagram schematically illustrating an example of the configuration of display control information saved in the storage unit of the information device;

DETAILED DESCRIPTION

Figure 1:
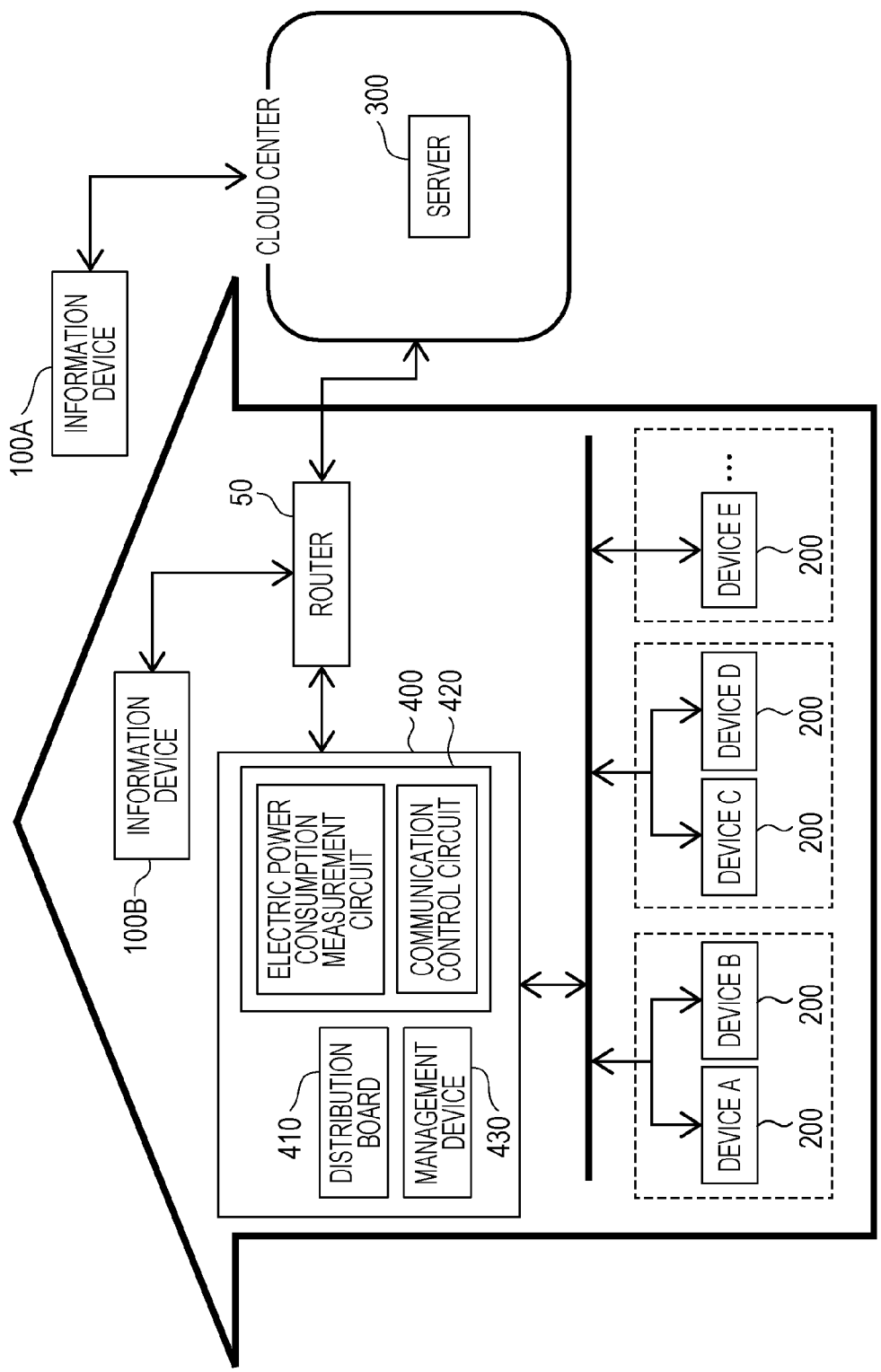
FIG. 1 is a block diagram schematically illustrating the overall configuration of a home control system to which an information device according to the present embodiment has been applied.

Underlying Knowledge Forming Basis of the Present Disclosure

First, a perspective regarding an aspect of the present disclosure will be described.

The above-described Japanese Unexamined Patent Application Publication No. 2000-138979 only describes displaying the on/off state of electric power of each device of interest and the temperature of each room, and there is no display of the amount of electric power consumed by the devices of interest situated in each room. On the other hand, a display representing the electric power consumption of each room could be simply added to the display representing the temperature of each room. However, just adding another type of display would make information presented to the user complicated since there is a limit to the display space, and there is a problem that there is a limit to displaying information necessary for the user.

The present inventors have reached the following aspects of the present invention from the aforementioned observation.

A control method according to an aspect of the present disclosure is a control method of an information device that has a display and is connected via a network to a distribution board system including a plurality of branch circuits including a first branch circuit to which two or more devices of interest have been correlated, and manages electric power consumption in increments of branch circuits, the control method causing a computer of the information device to acquire state information, indicating electric power consumption of each branch circuit, from the distribution board system via the network, display on the display two or more display objects corresponding to each of two or more devices of interest correlated with the first branch circuit, in an overlapped state, and also display an electric power display indicating electric power consumption corresponding to the first branch circuit, in a manner overlapping on the overlapped two or more display objects, and in a case where an operation is detected at overlapped two or more display objects, to separate the overlapped two or more display objects, display the overlapped two or more display objects in a separated manner, and display a device display representing each of the two or more devices of interest correlated with the first branch circuit, at each of the separated two or more display objects.

Simply indicating the electric power consumption of the living room, for example, does not enable the user to judge how many devices of interest being situated in the living room has resulted in that electric power consumption.

According to the present aspect, first, two or more display objects corresponding to each of two or more devices of interest correlated with the first branch circuit are displayed on the display in an overlapped state, and also an electric power display indicating electric power consumption corresponding to the first branch circuit is displayed in a manner overlapping on the overlapped two or more display objects. Accordingly, the user can comprehend the overall electric power consumption of the devices of interest correlated with of the first branch circuit.

Further, according to the present aspect, in a case where an operation is detected at overlapped two or more display objects to separate the overlapped two or more display objects, the overlapped two or more display objects are displayed in a separated manner, and a device display representing each of the two or more devices of interest correlated with the first branch circuit is displayed at each of the separated two or more display objects. Accordingly, the user can easily judge the types and number of devices of interest correlated with the first branch circuit. Consequently, the user can judge that the number of devices of interest being situated in the living room has resulted in that electric power consumption, for example.

Also, displaying of a device display representing each of the two or more devices of interest correlated with the first branch circuit at each of the separated two or more display objects is not a normal state. Display of the device display can be performed in a state where the two or more display objects corresponding to each of the two or more devices of interest are overlapped.

An arrangement may be conceived where a normal state is where the overall electric power consumption of devices of interest correlated with the first branch circuit is displayed, and also devices displays representing the devices of interest correlated with the first branch circuit are displayed. However, there are limits to the display space of the display. Accordingly, in a case where there is a great number of rooms, or in a case where the number of devices of interest situated is great, such as in a living room, for example, simply increasing the number of types displayed will make the information complicated for the user, and there will be cases where there is a limit to showing information necessary to the user.

According to the present embodiment, a display of a state where the two or more display objects are separated, and a display of a state where the two or more display objects are overlapped, can be switched between, so the limited display space can be effectively used.

In the above aspect, for example, in a case where an operation is detected on the display to overlap the separated two or more display objects, the separated two or more display objects may be displayed in an overlapped manner, and the device displays representing each of the two or more devices of interest correlated with the first branch circuit may be erased from each of the overlapped two or more display objects.

In a case where the two or more display objects are overlapped, the amount of display space corresponding to the first branch circuit is smaller. In this case, if the display of the device displays remains, multiple displays will be crowded on the reduced display space, and there is a possibility that the user may misrecognize important information.

According to the present aspect, in a case of overlapping the separated two or more display objects, the device displays are erased from each of the two or more display objects. Accordingly, the electric power display indicating the electric power consumption corresponding to the first branch circuit is displayed on the overlapped two or more display objects, and the device displays are not displayed. Accordingly, the user can comprehend the overall electric power consumption corresponding to the first branch circuit without misrecognizing.

In the above aspect, for example, in a case where an operation is detected on the display to separate the overlapped two or more display objects, the overlapped two or more display objects may be displayed separated, and the electric power display representing the electric power consumption corresponding to the first branch circuit may be erased.

In a state where the two or more display objects are in a separated state on the display, a display may be made of only the device displays representing each of the two or more devices of interest, without displaying the electric power display indicating the electric power consumption corresponding to the first branch circuit. In this case, the user can comprehend the two or more devices of interest correlated with the first branch circuit with a simple display.

In the above aspect, for example, in a case where judgment is made, using the state information, that the power of at least one of the devices of interest in the two or more devices of interest correlated with the first branch circuit is in an on state, the display of the two or more display objects corresponding to each of the two or more devices of interest correlated with the first branch circuit, in the overlapped state, may be displayed in a moving state.

According to the present aspect, in a case where the power of at least one of the devices of interest in the two or more devices of interest correlated with the first branch circuit is in an on state, the display of the two or more display objects corresponding to each of the two or more devices of interest in the overlapped state is displayed in a state moving in the up and down direction or left and right direction, for example. Accordingly, the user can determine that the power of at least one of the two or more devices of interest correlated with the first branch circuit is in an on state, simply by looking at the state of the overlapped two or more display objects corresponding to the two or more devices of interest. For example, the user can instantly recognize that he/she forgot to turn off the power for one of the devices of interest situated in the living room.

In the above aspect, for example, in a case where judgment is made, using the state information, that the power of all of the devices of interest in the two or more devices of interest correlated with the first branch circuit is in an off state, the display of the two or more display objects corresponding to each of the two or more devices of interest correlated with the first branch circuit, in the overlapped state, may be displayed in a stopped state.

According to the present aspect, in a case where the power of all of the devices of interest in the two or more devices of interest correlated with the first branch circuit is in an off state, the display of the two or more display objects corresponding to each of the two or more devices of interest in the overlapped state is displayed in a stationary state. Accordingly, the user can determine that the power of all of the two or more devices of interest correlated with the first branch circuit is in an off state, simply by looking at the display of the state of the overlapped two or more display objects corresponding to the two or more devices of interest. For example, the user can instantly recognize that the power for all of the devices of interest situated in a bedroom is off.

In the above aspect, for example, in a case where judgment is made, using the state information, that the power of at least one of the devices of interest in the two or more devices of interest correlated with the first branch circuit is in an on state, the display of the two or more display objects corresponding to each of the two or more devices of interest correlated with the first branch circuit, in the overlapped state, may be displayed in a color belonging to a first color group.

According to the present aspect, in a case where the power of at least one of the devices of interest in the two or more devices of interest correlated with the first branch circuit is in an on state, the display of the two or more display objects corresponding to each of the two or more devices of interest in the overlapped state is displayed in a color belonging to a first color group that is green, for example. Accordingly, the user can determine that the power of at least one of the two or more devices of interest correlated with the first branch circuit is in an on state, simply by looking at the display of the state of the overlapped two or more display objects corresponding to the two or more devices of interest. For example, the user can instantly recognize that he/she forgot to turn off the power for one of the devices of interest situated in the living room.

In the above aspect, for example, in a case where judgment is made, using the state information, that the power of all of the devices of interest in the two or more devices of interest correlated with the first branch circuit is in an off state, the display of the two or more display objects corresponding to each of the two or more devices of interest correlated with the first branch circuit, in the overlapped state, may be displayed in a color belonging to a second color group that is different from the first color group.

According to the present aspect, in a case where the power of all of the devices of interest in the two or more devices of interest correlated with the first branch circuit is in an off state, the display of the two or more display objects corresponding to each of the two or more devices of interest in the overlapped state is displayed in a color belonging to a second color group color that is gray, for example. Accordingly, the user can determine that the power of all of the two or more devices of interest correlated with the first branch circuit is in an off state, simply by looking at the state of the overlapped two or more display objects corresponding to the two or more devices of interest. For example, the user can instantly recognize that the power for all of the devices of interest situated in a bedroom is off.

In the above aspect, for example, the display of the two or more display objects corresponding to each of the two or more devices of interest correlated with the first branch circuit, in the overlapped state, is displayed larger the greater the electric power consumption of the first branch circuit is, and displayed smaller the smaller the electric power consumption of the first branch circuit is.

According to the present aspect, the size of display of the overlapped state of the two or more display objects corresponding to each of the two or more devices of interest correlated with the first branch circuit changes in accordance with the electric power consumption corresponding to the first branch circuit. Accordingly, the user can easily comprehend at a glance whether the electric power consumption of the first branch circuit is great or small.

In the above aspect, for example, the distribution board system may include a second branch circuit with which two or more devices of interest are correlated, where two or more display objects corresponding to each of two or more devices of interest correlated with the second branch circuit are displayed on the display, in an overlapped state, and also an electric power display indicating electric power consumption of the second branch circuit is displayed, in a manner overlapping on the overlapped two or more display objects, and where the display of the two or more display objects corresponding to each of the two or more devices of interest correlated with the second branch circuit, in the overlapped state, is displayed larger the greater the electric power consumption of the second branch circuit is, and displayed smaller the smaller the electric power consumption of the second branch circuit is.

According to the present aspect, the size of display of the overlapped state of the two or more display objects corresponding to each of the two or more devices of interest correlated with the second branch circuit changes in accordance with the electric power consumption corresponding to the second branch circuit, in the same way as with the first branch circuit. Accordingly, in a case where the display where the two or more display objects corresponding to the two or more devices of interest correlated with the first branch circuit are in a overlapped state is larger than the display where the two or more display objects corresponding to the two or more devices of interest correlated with the second branch circuit are in a overlapped state, the user can instantly distinguish that the electric power consumption corresponding to the first branch circuit is greater than the electric power consumption of the second branch circuit.

In the above aspect, for example, the distribution board system may include a second branch circuit with which two or more devices of interest are correlated, where two or more display objects corresponding to each of two or more devices of interest correlated with the second branch circuit are displayed on the display, in an overlapped state, and also an electric power display indicating electric power consumption of the second branch circuit is displayed, in a manner overlapping on the overlapped two or more display objects, and where, in a case where an operation is detected at overlapped two or more display objects relating to the second branch circuit, to separate the overlapped two or more display objects, the overlapped two or more display objects are displayed in a separated manner, a device display representing each of the two or more devices of interest correlated with the second branch circuit is displayed at each of the separated two or more display objects, and the separated two or more display objects relating to the first branch circuit are displayed overlapped.

According to the present aspect, in a case where an operation is detected to separate two or more display objects corresponding to a certain branch circuit, the two or more display objects regarding the certain branch circuit are displayed in a separated manner, and also, if there is a display corresponding to another branch circuit already separated, the two or more display objects corresponding to the other branch circuit are displayed overlapped.

According to this, by performing an operation to separate overlapped two or more display objects corresponding to the second branch circuit not only displays the overlapped two or more display objects corresponding to the second branch circuit not in a separated manner and displays device displays representing each of the two or more devices of interest correlated with the second branch circuit, but also, the separated two or more display objects corresponding to the first branch circuit are displayed overlapped.

Accordingly, by performing the operation of separating the overlapped two or more display objects corresponding to the second branch circuit displays the separated two or more display objects corresponding to the first branch circuit in an overlapped manner, without the user performing an operation of overlapping the separated two or more display objects corresponding to the first branch circuit. Accordingly, the operation of overlapping the separated two or more display objects corresponding to the first branch circuit can be omitted. Consequently, the number of operations can be reduced.

Also, the display space of the display is limited. In a case of performing an operation to separate the overlapped two or more display objects corresponding to the second branch circuit, if not only a separated display is made of the two or more display objects corresponding to the second branch circuit but also a separated display is made of the two or more display objects corresponding to the first branch circuit, there is a possibility that one display of the display corresponding to the first branch circuit and the display corresponding to the second branch circuit will run off of the edge of the display space of the display, and not be visible.

According to the present aspect, performing an operation of separating the overlapped two or more display objects corresponding to the second branch circuit effects control to display the two or more display objects corresponding to the second branch circuit in a separated manner, and also to display the two or more display objects corresponding to the first branch circuit in an overlapped manner. Accordingly, control is effected so that both the display corresponding to the first branch circuit and the display corresponding to the second branch circuit can fit within the display space of the display as much as possible, while effectively using the limited display space of the display. Consequently, display space for a display corresponding to the first branch circuit can be secured even in a case of performing an operation to separate the overlapped two or more display objects corresponding to the second branch circuit.

In the above aspect, for example, in a case where the two or more display objects are displayed overlapped on the display, and only a part of at least on one display object in the two or more display objects is displayed on the display, upon selection of the part being detected, the overlapped two or more display objects may be displayed separated, and the entirety of the two or more display objects may be moved to a position where the entirety of the separated two or more display objects can be displayed on the display.

In a case of displaying the two or more display objects from an overlapped state to a separated state, if at least one of the overlapped two or more display objects partially runs off the edge of the display and is hidden, there may be cases where displaying the overlapped two or more display objects in a separated manner may result in not all of the separated display objects being displayed within the display region of the display.

According to the present aspect, in a case where only a part of at least one display object of the two or more display objects in an overlapped state being displayed on the display, selecting the part causes the overlapped two or more display objects to be displayed separated, so all of the separated two or more display objects are displayed within the display region of the display.

Accordingly, all of the two or more display objects can be displayed in a state where the two or more display objects are separated, regardless of where the position on the display is of the two or more display objects displayed in an overlapped state. Accordingly, the user can confirm the device displays displayed for each of the separated two or more display objects, without misrecognizing.

In the above aspect, for example, in a case where a scroll operation is detected on the display in a state where the separated two or more display objects are displayed, the separated two or more display objects may be displayed overlapped.

According to the present aspect, in a case where a scroll operation is detected on the display in a state where the separated two or more display objects are displayed, the two or more display objects are not moved while still in the state of the two or more display objects being separated, rather, the separated two or more display objects are displayed overlapped and moved.

That is to say, the operation of scrolling the display screen displayed on the display also serves as an operation to overlap the separated two or more display objects, without requesting the user to perform an operation of overlapping the separated two or more display objects separately from the scroll operation on the display. Accordingly, there is no need to perform an operation of overlapping the separated two or more display objects separately from the operation of scrolling the display screen displayed on the display, thereby reducing the operating burden.

Also, the separated two or more display objects are automatically overlapped when scrolling the display screen, so the amount of available region on the display space automatically increases, and the limited display space of the display can be effectively used.

In the above aspect, for example, the device displays representing each of the two or more devices of interest may be images representing the devices of interest.

In the above aspect, for example, the distribution board system may include a distribution board that distributes external electric power to the two or more devices of interest, and a measurement device that measures electric power consumption of the two or more devices of interest in increments of the branch circuits.

In the above aspect, for example, the distribution board system may include a distribution board that distributes external electric power to the two or more devices of interest, and measures electric power consumption of the two or more devices of interest in increments of the branch circuits.

In the above aspect, for example, the display may be a touch panel display, where the operation at the overlapped two or more display objects to separate the overlapped two or more display objects includes an operation of tapping on the overlapped two or more display objects.

In the above aspect, for example, the display may be a touch panel display, where the operation to overlap the separated two or more display objects includes an operation of tapping on any one of the separated two or more display objects.

Another aspect of the present disclosure is a program executed at an information device that has a display and is connected via a network to a distribution board system includes a plurality of branch circuits including a first branch circuit to which two or more devices of interest have been correlated, and manages electric power consumption in increments of branch circuits, the program causing a computer of the information device to execute processing of acquiring state information, indicating electric power consumption of each branch circuit, from the distribution board system via the network, processing of displaying on the display two or more display objects corresponding to each of two or more devices of interest correlated with the first branch circuit, in an overlapped state, and also displaying an electric power display indicating electric power consumption corresponding to the first branch circuit, in a manner overlapping on the overlapped two or more display objects, and processing of, in a case where an operation is detected at overlapped two or more display objects, separating the overlapped two or more display objects, displaying the overlapped two or more display objects in a separated manner, and displaying a device display representing each of the two or more devices of interest correlated with the first branch circuit, at each of the separated two or more display objects.

A further aspect of the present disclosure is an information device to which is loaded the program according to the above another aspect.

Embodiment

An embodiment of the present disclosure will be described with reference to the drawings. Note that the same components are denoted by the same reference numerals in the drawings. An information device for displaying to the user electric power consumption of devices of interest correlated with branch circuits, in increments of branch circuits, will be described in the present embodiment.

FIG. 1 is a block diagram schematically illustrating the overall configuration of a home control system to which an information device according to the present embodiment has been applied. The home control system includes information devices 100A and 100B, devices 200 (examples of devices of interest), a server 300, an electric power management system 400, and a router 50.

The information device 100B, two or more devices 200 (e.g., device A 200 through device E 200), the electric power management system 400, and the router 50 are installed in the house. The cloud center has the server 300 situated within.

The information devices 100A and 100B, server 300, and electric power management system 400 communicate with each other via a cabled or wireless network. For example, the information device 100B and the electric power management system 400 are mutually communicably connected via a wireless or cabled home network and the router 50. The information device 100B, electric power management system 400, and server 300 are mutually communicably connected via an external network such as the Internet and the router 50. The information device 100A, electric power management system 400, and server 300 are mutually communicably connected via an external network such as the Internet.

Examples of the information device 100A include portable mobile information devices such as a smartphone, tablet computer, cellular phone, or the like. The information device 100B is a personal computer (PC) for example that is installed in the home. Hereinafter, the information device 100A and information device 100B will be collectively referred to as information device 100, when not distinguished.

The electric power management system 400 includes a distribution board 410, a measurement device 420, and a management device 430. The distribution board 410 and devices 200 are mutually connected via branch circuit. The configuration of the electric power management system 400 and the connection state between the electric power management system 400 and the devices 200 will be described next with reference to FIG. 2. The server 300 and the electric power management system 400 according to the present embodiment make up an example of the distribution board system.

Figure 2:
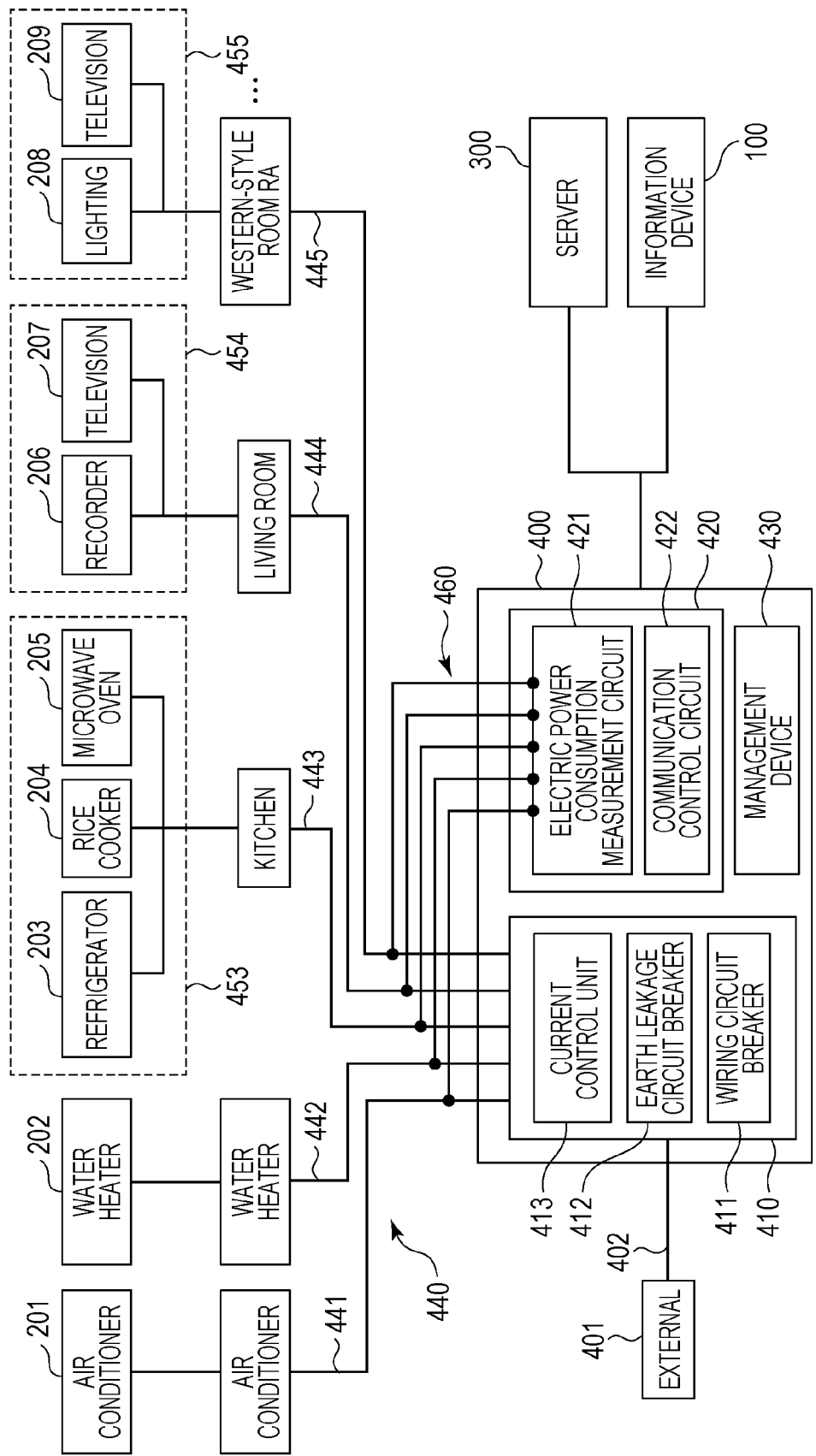
FIG. 2 is a block diagram illustrating, in further detail, a state of connection between an electric power management system and devices in the home control system in FIG. 1.

FIG. 2 is a block diagram illustrating the state of connection between the electric power management system 400 and devices 200 in the home control system in FIG. 1, in further detail. The home control system has, as specific examples of the devices 200, an air conditioning device (hereinafter referred to as "air conditioner") 201, a water heater 202, a refrigerator 203, a rice cooker 204, a microwave oven 205, a recorder 206, a television receiver (hereinafter referred to as "television") 207, a lighting device 208, and a television 209. Note that multiple devices 200 of the same type may be included as the devices 200, such as the televisions 207 and 209.

The distribution board 410 of the electric power management system 400 is a known device that obtains electric power from outside (e.g., power transmission lines of an electric power company) 401 via a power cable 402, and distributes the obtained electric power to the devices 200 via power cables 440. The distribution board 410 has a known wiring circuit breaker 411, an earth leakage circuit breaker 412, and a current control unit 413, to user electric power safely.

The home control system in FIG. 2 has branch circuits 441 through 445 as the power cables 440 connected to the distribution board 410. The branch circuit 441 is connected to the air conditioner 201. The branch circuit 441 has been given the name "air conditioner". The branch circuit 442 is connected to the water heater 202. The branch circuit 442 has been given the name "water heater". In this way, the branch circuits 441 and 442 are each connected to a single device 200.

The branch circuit 443 further branches, and is connected to each of the refrigerator 203, rice cooker 204, and microwave oven 205. A device group 453 including the refrigerator 203, rice cooker 204, and microwave oven 205 is situated in the kitchen, for example. Accordingly, the branch circuit 443 has been given the name "kitchen".

The branch circuit 444 further branches, and is connected to each of the recorder 206 and television 207. A device group 454 including the water heater 202, recorder 206, and television 207, is located in the living room, for example. Accordingly, the branch circuit 444 has been given the name "living room".

The branch circuit 445 further branches, and is connected to each of the lighting device 208 and television 209. A device group 455 including the lighting device 208 and television 209 is situated in one of multiple western-style rooms. Accordingly, the branch circuit 445 has been given the name "western-style room RA".

The measurement device 420 of the electric power management system 400 has an electric power consumption measurement circuit 421 and a communication control circuit 422. The branch circuits 441 through 445 are each connected to the electric power consumption measurement circuit 421 via a communication line 460.

The electric power consumption measurement circuit 421 measures the electric power consumption of the devices connected to the branch circuits 441 through 445, in increments of branch circuits. That is to say, the electric power consumption measurement circuit 421 measures the electric power consumption for the air conditioner 201, the water heater 202, and the device groups 453, 454, and 455. The communication control circuit 422 transmits the electric power consumption measured by the electric power consumption measurement circuit 421 to the management device 430.

Although FIGS. 1 and 2 illustrate the distribution board 410 and measurement device 420 as separate configurations, the present disclosure is not restricted to this arrangement. Alternatively, the distribution board 410 may have the functions of the measurement device 420. That is to say, the distribution board 410 and measurement device 420 may be configured integrally. The communication control circuit 422 may transmit the electric power consumption measured by the electric power consumption measurement circuit 421 directly to the server 300.

Figure 3:
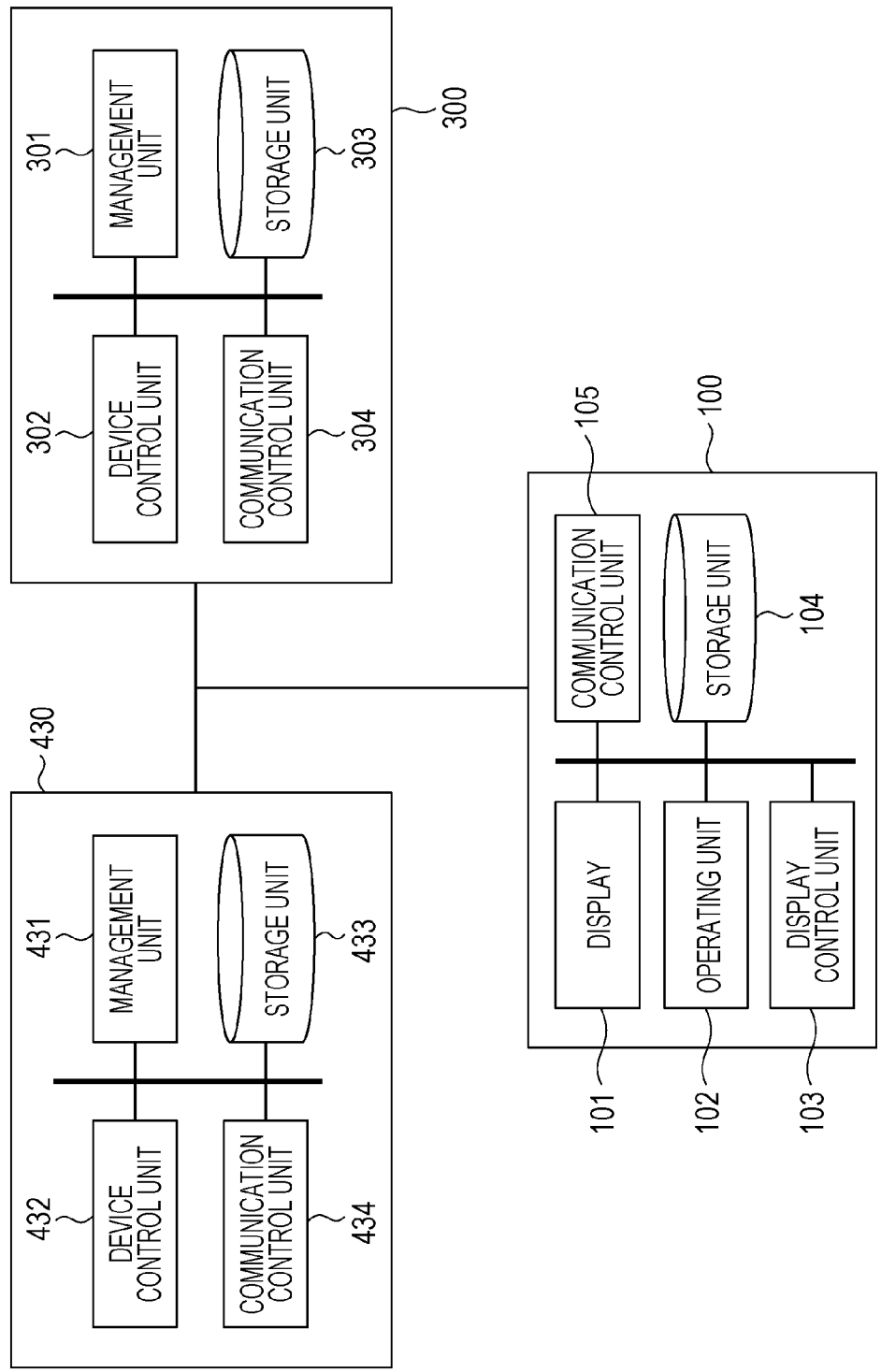
FIG. 3 is a block diagram schematically illustrating the configuration of an information device, a server, and a management device.

FIG. 3 is a block diagram schematically illustrating the configuration of the information device 100, the server 300, and the management device 430. The information device 100 has, for example, a microprocessor, read-only memory (ROM), random access memory (RAM), and so forth. The information device 100 includes a display 101, an operating unit 102, a display control unit 103, a storage unit 104, and a communication control unit 105.

The display 101 is configured as a touch panel display for example, and displays a user interface of the user to operate the information device 100, and so forth. The user can input various types of operations to the information device 100 by touching the display 101.

Upon recognizing an operation at the display 101, the operating unit 102 interprets the content of that operation, and notifies other components of the content of the operation. For example, if an object is displayed at a position on the display 101 where the user has taped, the operating unit 102 determines that object to have been selected by the user. Various types of graphical user interface (GUI) parts that accept user operations, such as buttons and the like, are employed as objects.

The communication control unit 105 controls communication between the information device 100 and the server 300, and communication between the information device 100 and the management device 430. The communication control unit 105 also accepts transmission requests for various types of data from other blocks and transmits to the server 300 or the management device 430, and also receives data transmitted from the server 300 or management device 430, and hands to the relevant blocks.

The display control unit 103 uses the information obtained via the communication control unit 105 to generate a GUI for the information device 100, which is displayed on the display 101. The storage unit 104 stores information set by the user and information and the like received from the server 300 via the communication control unit 105.

Note that the display 101 may be a normal display instead of a touch panel display. In this case, the user may use an unshown external input device such as a mouse to move a pointer displayed on the display 101 to a desired object and click, so as to input a selection instruction of the object. That is to say, the series of operations performed by the user touching the display 101 in the present embodiment can be replaced by operations of moving a pointer and clicking using an external input device such as a mouse.

The server 300 has a microprocessor, ROM, RAM, and so forth, for example. The server 300 includes a management unit 301, a device control unit 302, a storage unit 303, and a communication control unit 304. The communication control unit 304 controls communication between the server 300 and the information device 100, and communication between the server 300 and the management device 430. The communication control unit 304 also accepts transmission requests for various types of data from other blocks and transmits to the information device 100 or the management device 430, and also receives data transmitted from the information device 100 or management device 430, and hands to the relevant blocks.

The management unit 301 stores electric power consumption for the devices 200 received from the electric power management system 400 in the storage unit 303 via the communication control unit 304, and manages in increments of homes (i.e., in increments of distribution boards 410). The management unit 301 also acquires information such as a later-described branch circuit list 1500 (FIG. 15) and the like from the electric power management system 400, stores the acquired information in the storage unit 303, and manages in increments of homes.

The device control unit 302 generates electric power consumption information 1800 (described later) based on the electric power consumption transmitted from the electric power management system 400. The device control unit 302 stores the generated electric power consumption information 1800 in the storage unit 303. The storage unit 303 stores information such as the electric power consumption and so forth of devices that the management unit 301 manages, and stores information necessary for operation of the server 300.

The management device 430 has a microprocessor, ROM, RAM, and so forth, for example. The management device 430 has a management unit 431, a device control unit 432, a storage unit 433, and a communication control unit 434, in the same way as the server 300, as illustrated in FIG. 3.

The communication control unit 434 controls communication between the management device 430 and the information device 100, communication between the management device 430 and the measurement device 420, and communication between the management device 430 and the server 300. The communication control unit 434 receives information relating to electric power consumption transmitted by the measurement device 420, and transmits the received information to the server 300. The communication control unit 434 also accepts transmission requests for various types of data from other blocks and transmits to the information device 100 or the server 300, and also receives data transmitted from the information device 100 or server 300, and hands to the relevant blocks.

The management unit 431, device control unit 432, and storage unit 433 of the management device 430 may serve the same function as the management unit 301, device control unit 302, and storage unit 303 of the server 300. The management device 430 may function as an in-home server.

Figure 4:
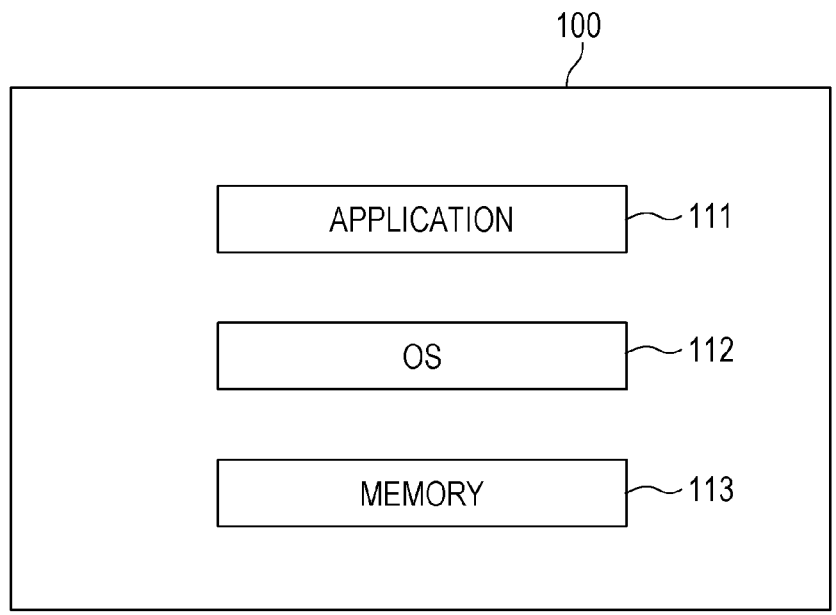
FIG. 4 is a block diagram illustrating a configuration example of an implementation form of an information device.

FIG. 4 is a block diagram illustrating a configuration example of an implementation of the information device 100. The information device 100 includes an application 111, an operating system (OS) 112, memory 113, and other hardware that is omitted from illustration.

The application 111 is application software to cause an information device having a computer, such as a tablet, laptop, desktop, etc., personal computer, or a smartphone or the like, to function as the information device 100, and is executed by the processor of the information device 100. The information device 100 may read out the application 111 from a computer-readable recording medium and implement the application 111, or may implement the application 111 by downloading from a network.

The OS 112 is basic software for the information device 100, and is executed by the processor of the information device 100. Then memory 113 is made up of storage devices such as RAM, ROM, and so forth, that the information device 100 has, and stores data groups included in the application 111. The functions of the operating unit 102, display control unit 103, storage unit 104, and communication control unit 105, illustrated in FIG. 3, are realized by the processor of the information device 100 executing the application 111. The memory 113 functions as the storage unit 104 by the processor of the information device 100 executing the application 111.

It should be noted that the information device 100 according to the present embodiment may be provided with the application 111 alone, or may be provided with the application 111 and OS 112, or may be provided with the application 111, OS 112, and memory 113, or may be provided with the application 111, OS 112, memory 113, and other hardware not illustrated in the drawings. The information device 100 according to the present embodiment can be realized by any of these forms.

In the present embodiment, a computer is made up of, for example, a processor and storage device making up the information device 100. Any one of a CPU, FPGA, and ASIC, or a combination of two or more thereof, is employed as the processor. Any one of, for example, ROM, RAM, and a hard disk, or a combination of two or more thereof, is employed as the storage device.

Figure 5:
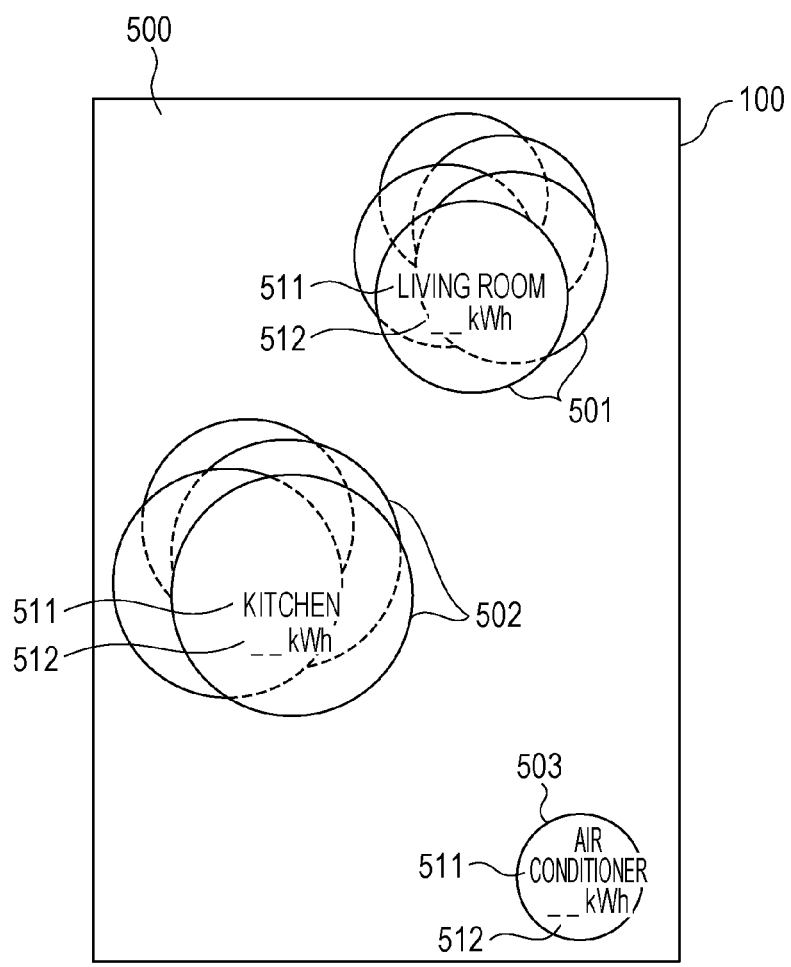
FIG. 5 is a diagram schematically illustrating an example of a home screen displayed on a display of the information device.

FIG. 5 is a diagram schematically illustrating an example of a home screen 500 displayed on the display 101 of the information device 100. When the home control system according to the present embodiment is activated, the display control unit 103 displays the home screen 500 illustrated in FIG. 5 on the display 101 of the information device 100.

The home screen 500 includes a display object group where two or more display objects 501 overlap each other, a display object group where two or more display objects 502 overlap each other, and a display object group 503. The display objects 501, 502, and 503 have circular shapes in the example in FIG. 5. The home screen 500 further includes branch circuit names 511 and electric power consumption displays 512 (an example of electric power display) displayed overlapped on the display objects 501, 502, and 503.

The object group including two or more display objects 501, the object group including two or more display objects 502, and the display object group 503, are each provided corresponding to the branch circuits illustrated in FIG. 2. For example, the branch circuit name 511 displayed on the display objects 501 says "living room". Thus, the display object group where the two or more display objects 501 overlap each other is clearly indicated to be corresponding to the branch circuit 444 (FIG. 2).

Also, the branch circuit name 511 displayed on the display objects 502 says "kitchen". Thus, the display object group where the two or more display objects 502 overlap each other is clearly indicated to be corresponding to the branch circuit 443 (FIG. 2). Also, the branch circuit name 511 displayed on the display objects 503 says "air conditioner". Accordingly, the display object 503 is clearly indicated to be corresponding to the branch circuit 441 (FIG. 2).

Figure 6:
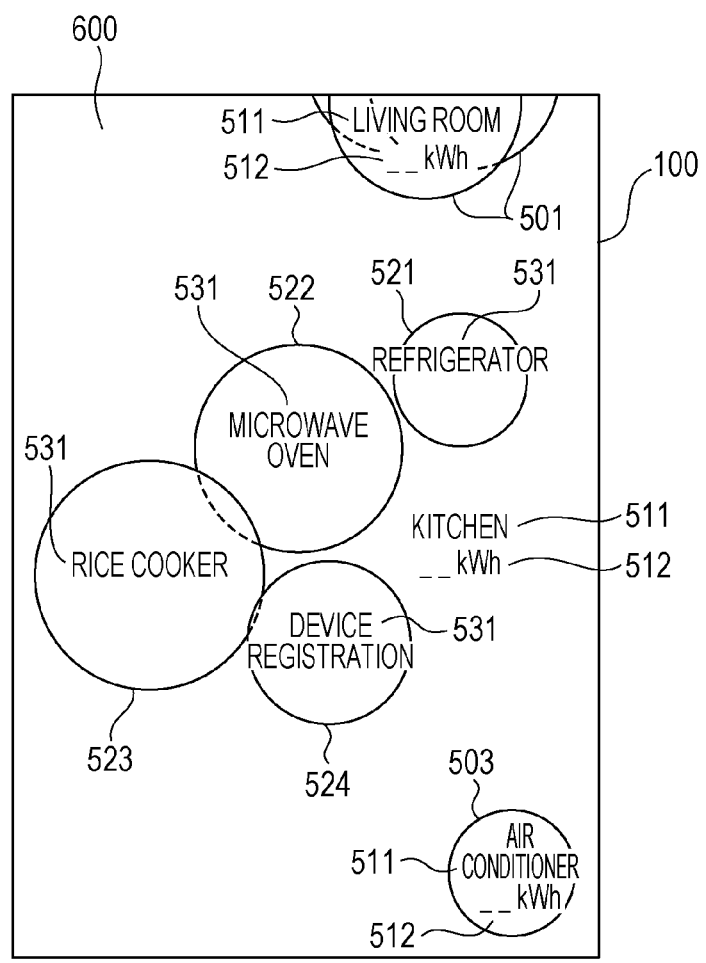
FIG. 6 is a diagram schematically illustrating an example of a separated screen displayed on the display of the information device.

FIG. 6 is a diagram schematically illustrating an example of a separated screen 600 displayed on the display 101 of the information device 100. When the user taps on an object group including the two or more display objects 502 in the home screen 500 illustrated in FIG. 5, the operating unit 102 detects the tap. The display control unit 103 then switches the display screen displayed on the display 101 of the information device 100 from the home screen 500 illustrated in FIG. 5 to the separated screen 600 illustrated in FIG. 6.

In the separated screen 600 illustrated in FIG. 6, the display object group of which the branch circuit name 511 is "kitchen" is displayed separated into display objects 521 through 524. The branch circuit name 511 and electric power consumption display 512 that had been displayed overlapping the display object 502 in the home screen 500 are displayed right next to the display objects 521 through 524.

Above the display objects 521 through 524, displayed in a separated manner, are displayed device names 531 (an example of device display) in an overlapping manner. The device names 531 displayed overlapped above the display objects 521 through 523 state "refrigerator", "microwave oven", and "rice cooker", respectively. The user can confirm that "refrigerator", "microwave oven", and "rice cooker" are correlated with the branch circuit where the branch circuit name 511 is "kitchen" by looking at the device names 531.

The device name 531 displayed overlapped on the display object 524 says "device registration". Tapping on the display object 524 in the separated screen 600 illustrated in FIG. 6 enables the device to be newly registered. Device registration will be described later.

The user can easily confirm the electric power consumption at each branch circuit by looking at the electric power consumption display 512 in the home screen 500 illustrated in FIG. 5. The home screen 500 is capable of displaying display objects of more branch circuits on the display 101 that is limited in display area, by overlapping the display objects.

The user can also easily judge the type and number of devices 200 correlated with each branch circuit by the separated screen 600 illustrated in FIG. 6. Accordingly, the user can easily judge that the electric power consumption in the living room, for example, is at the level that it is, due to however many devices 200 that have been installed there.

In the home screen 500 illustrated in FIG. 5, only the display objects 501 through 503 are displayed, and other display object are hidden, due to limitation of area of the display 101. When the user performs a predetermined operation, such as a swipe operation in the vertical direction for example, on the home screen 500 illustrated in FIG. 5, the operating unit 102 detects that operation. The display control unit 103 then scrolls the display screen and displays the display objects hidden from display in FIG. 5 on the display 101.

The display object 522 and display object 523, and the display object 523 and display object 524, are slightly overlapping on the separated screen 600 illustrated in FIG. 6. However, each of the display objects 522 through 524 are away from each other with enough space to display the device names 531. In this way, the term "display objects are separated" is used in the present embodiment in a case where they are separated with enough space to display the device names 531, even if overlapping somewhat.

Figure 7:
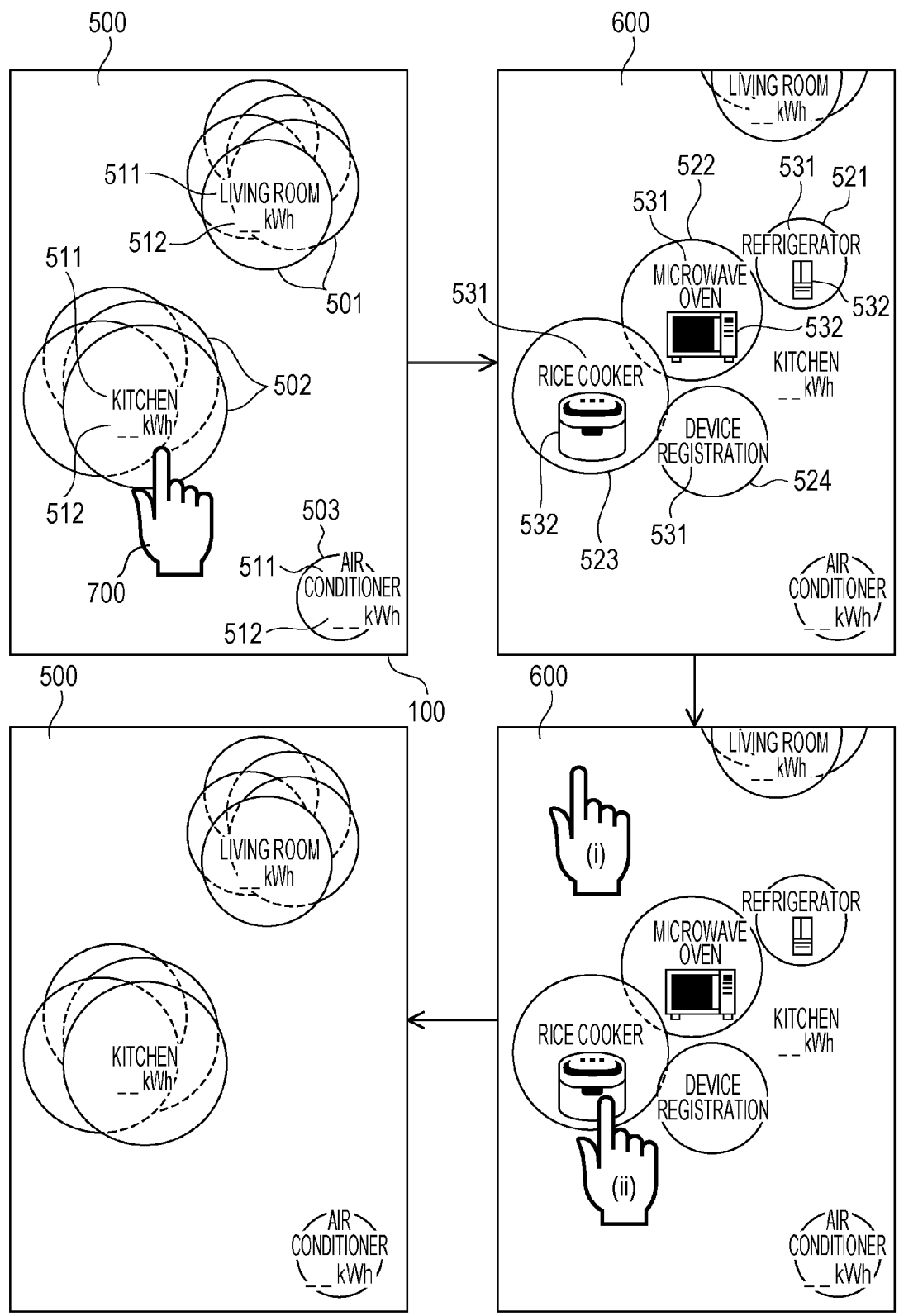
FIG. 7 is a diagram schematically illustrating an example of transition of display screens on the display of the information device.

FIG. 7 is a diagram schematically illustrating an example of transition of display screens on the display 101 of the information device 100. When the user taps on an object group including two or more display objects 502 on the home screen 500 illustrated in FIG. 7 at the upper left, using a contact object 700 (e.g., a finger of the user), the operating unit 102 detects the tap. The display control unit 103 then switches the display screen displayed on the display 101 of the information device 100 from the home screen 500 illustrated in FIG. 7 at the upper left, to the separated screen 600 illustrated in FIG. 7 at the upper right.

In the separated screen 600 illustrated in FIG. 7 at the upper right, the display object group of which the branch circuit name 511 is "kitchen", is displayed with the display objects 521 through 524 separated, in the same way as in FIG. 6. The branch circuit name 511 and electric power consumption display 512 that had been displayed in an overlapped manner on the display objects 502 in the home screen 500 are displayed right next to the display objects 521 through 524 displayed in a separated manner.

In addition to the device names 531, device icons 532 (an example of device display) are displayed above the display objects 521 through 523 in an overlapping manner. The device icons 532 schematically represent the devices 200. The device icons 532 on the display objects 521 through 523 schematically represent "refrigerator", "microwave oven", and "rice cooker", respectively.

In the separated screen 600, upon the user taping on a region other than a display region of a display object with the contact object 700, as indicated by (i) at the lower right in FIG. 7, the operating unit 102 detects the tap. The display control unit 103 then switches the display screen displayed on the display 101 of the information device 100 from the separated screen 600 illustrated in FIG. 7 at the lower right, to the home screen 500 illustrated in FIG. 7 at the lower left.

Also, upon the user taping on a region other than one of the display objects 521 through 523 displayed separated, with the contact object 700, as indicated by (ii) at the lower right in FIG. 7, the operating unit 102 detects the tap. The display control unit 103 then switches the display screen displayed on the display 101 of the information device 100 from the separated screen 600 illustrated in FIG. 7 at the lower right, to the home screen 500 illustrated in FIG. 7 at the lower left.

Thus, the display screen displayed on the display 101 of the information device 100 can be easily returned from the separated screen 600 to the home screen 500 by tapping either of a region other than a display region of a display object, and one of the display objects 521 through 523 displayed in a separated manner.

Figure 8:
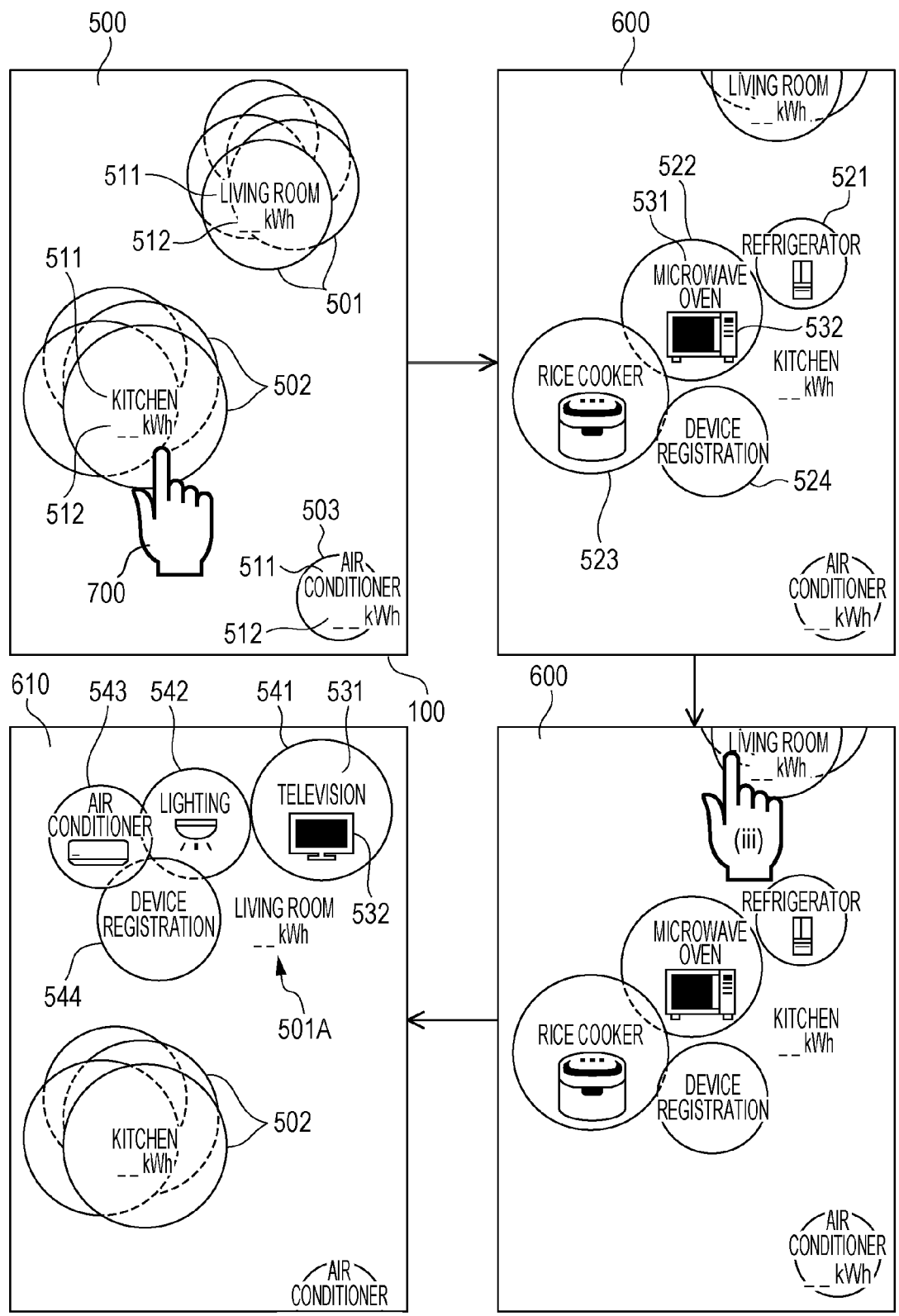
FIG. 8 is a diagram schematically illustrating another example of transition of display screens on the display of the information device.

FIG. 8 is a diagram schematically illustrating another example of transition of display screens on the display 101 of the information device 100. The upper left drawing and upper right drawing in FIG. 8 are the each same as the upper left drawing and upper right drawing in FIG. 7. The display control unit 103 switches the display 101 of the information device 100 from the home screen 500 illustrated in FIG. 8 at the upper left to the separated screen 600 illustrated in FIG. 8 at the upper right, by the procedures described with reference to FIG. 7.

The display objects 521 through 524 are displayed separated in the separated screen 600 (upper right in FIG. 8). Accordingly, the display area is larger as compared to the case where two or more display objects 502 are displayed overlapped in the home screen 500 (upper left in FIG. 8). As a result, the display position of the display object group displayed in an overlapped manner (e.g., display object group where the branch circuit name 511 is "living room") where two or more display objects 501 are displayed moves upward from the position illustrated at the upper left in FIG. 8, so that a portion thereof goes past the edge of the display 101, and just a part thereof is displayed on the display 101.

Upon the user taping on the display object 501 in such a state with the contact object 700, as indicated by (iii) at the lower right in FIG. 8, the operating unit 102 detects the tap. The display control unit 103 then switches the display screen displayed on the display 101 of the information device 100 from the separated screen 600 illustrated in FIG. 8 at the lower right, to a separated screen 610 illustrated in FIG. 8 at the lower left.

In the separated screen 610 illustrated in FIG. 8 at the lower left, the display object group of which the branch circuit name 511 is "living room" is displayed separated into display objects 541 through 544. The branch circuit name 511 and the electric power consumption display 512 which each had been displayed overlapped on the display object 501 in the home screen 500 is displayed right next to the display objects 541 through 544 displayed in a separated manner.

Also, in the separated screen 610 at the lower left in FIG. 8, the display objects 521 through 524 of which the branch circuit name 511 is "kitchen", displayed separated in the separated screen 600 (lower right in FIG. 8), are displayed as two or more display objects 502 overlapped in the same way as in the home screen 500 (upper left in FIG. 8).

As described above, in a case where one of two or more display objects 501 displayed just partially on the display 101 in an overlapped manner is tapped on the display 101 of the information device 100, the display control unit 103 moves that display object downwards, and displays the entirety of the separated display objects 541 through 544 on the display 101. This proactively prevents part of the separated display objects 541 through 544 from being hidden.

Also, in the separated screen 610 at the lower left in FIG. 8, the display objects 521 through 524 of which the branch circuit name 511 is "kitchen", displayed separated in the separated screen 600 when tapped by the user (lower right in FIG. 8), are returned to the overlapped displayed state (the state in the home screen 500 illustrated in FIG. 8 at the upper left). Accordingly, only one branch circuit has the display objects separated and displayed on the display 101 of the information device 100. Consequently, the screen display on the display 101 can be prevented from becoming complicated. This is also advantageous in that the limited screen display on the display 101 is not wasted. Further, the number of user operations can be reduced, since there is no need to perform overlapping operations.

Figure 9:
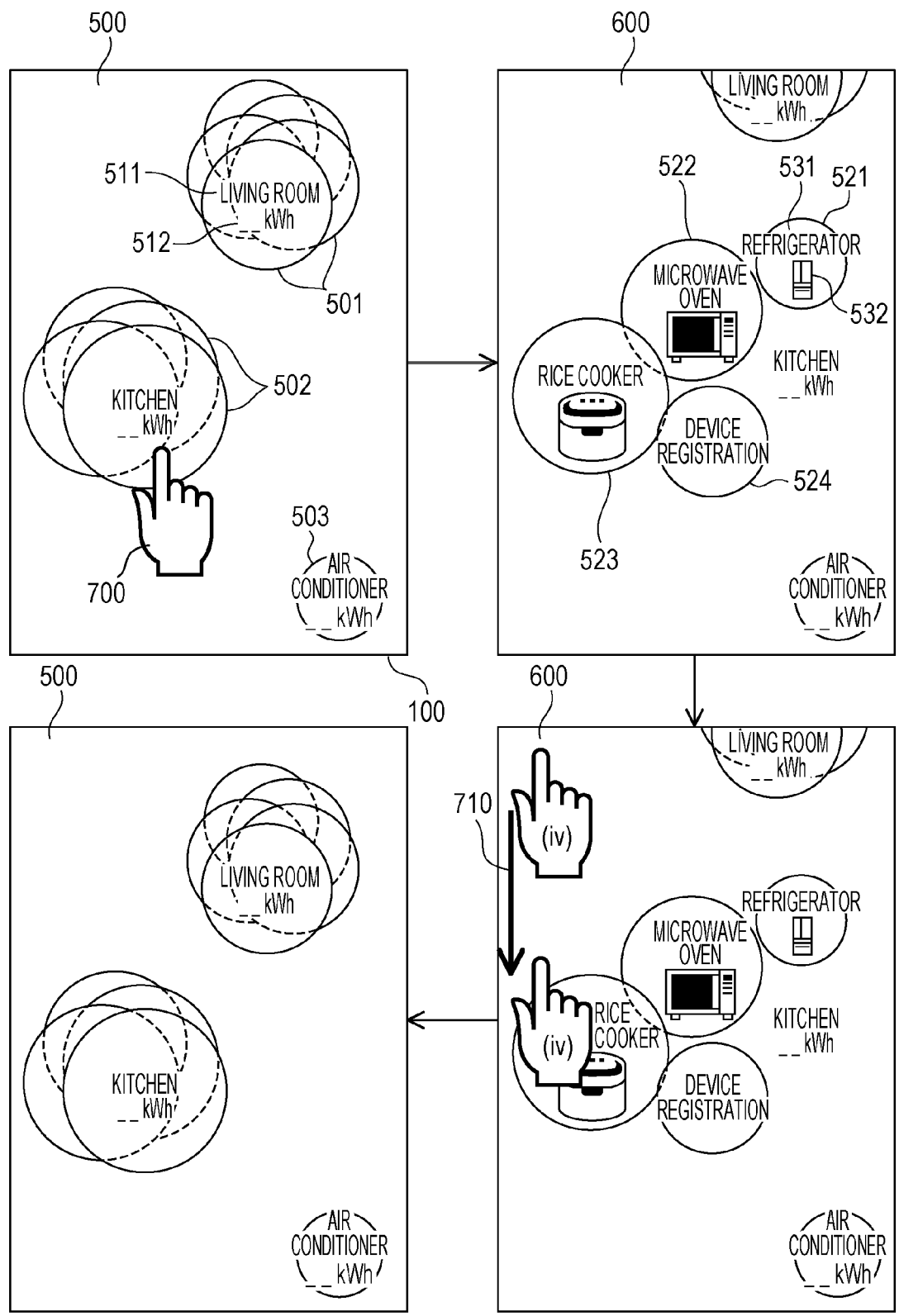
FIG. 9 is a diagram schematically illustrating yet another example of transition of display screens on the display of the information device.

FIG. 9 is a diagram schematically illustrating yet another example of transition of display screens on the display 101 of the information device 100. The upper left drawing and upper right drawing in FIG. 9 are the each same as the upper left drawing and upper right drawing in FIG. 7. The display control unit 103 switches the display 101 of the information device 100 from the home screen 500 illustrated in FIG. 9 at the upper left to the separated screen 600 illustrated in FIG. 9 at the upper right, by the procedures described with reference to FIG. 7.

In the state where the separated screen 600 is displayed as illustrated to the upper right in FIG. 9, upon the user performing a swipe operation 710 which is to bring the contact object 700 in contact with the display 101 and then move, as indicated by (iv) at the lower right in FIG. 9, the operating unit 102 detects the swipe operation 710. The display control unit 103 then switches the display screen displayed on the display 101 of the information device 100 from the separated screen 600 illustrated in FIG. 9 at the lower right, to the home screen 500 illustrated in FIG. 9 at the lower left.

Thus, the display screen displayed on the display 101 of the information device 100 can be returned from the separated screen 600 to the home screen 500 by a swipe operation over the separated screen 600 as well.

As a result, a swipe operation enables the separated screen 600 to be returned to the home screen 500 as well as scrolling at the same time to get closer to the display objects corresponding to a branch circuit to be viewed (e.g., display objects corresponding to the living room), so there is no need to perform operations to close the display objects corresponding to the kitchen for example, and the number of operations can be reduced.

The home screen displayed on the display 101 of the information device 100 is not restricted to the screen illustrated in FIG. 5. For example, turning the power of the device 200 on or off may be expressed at the home screen.

Figure 10:
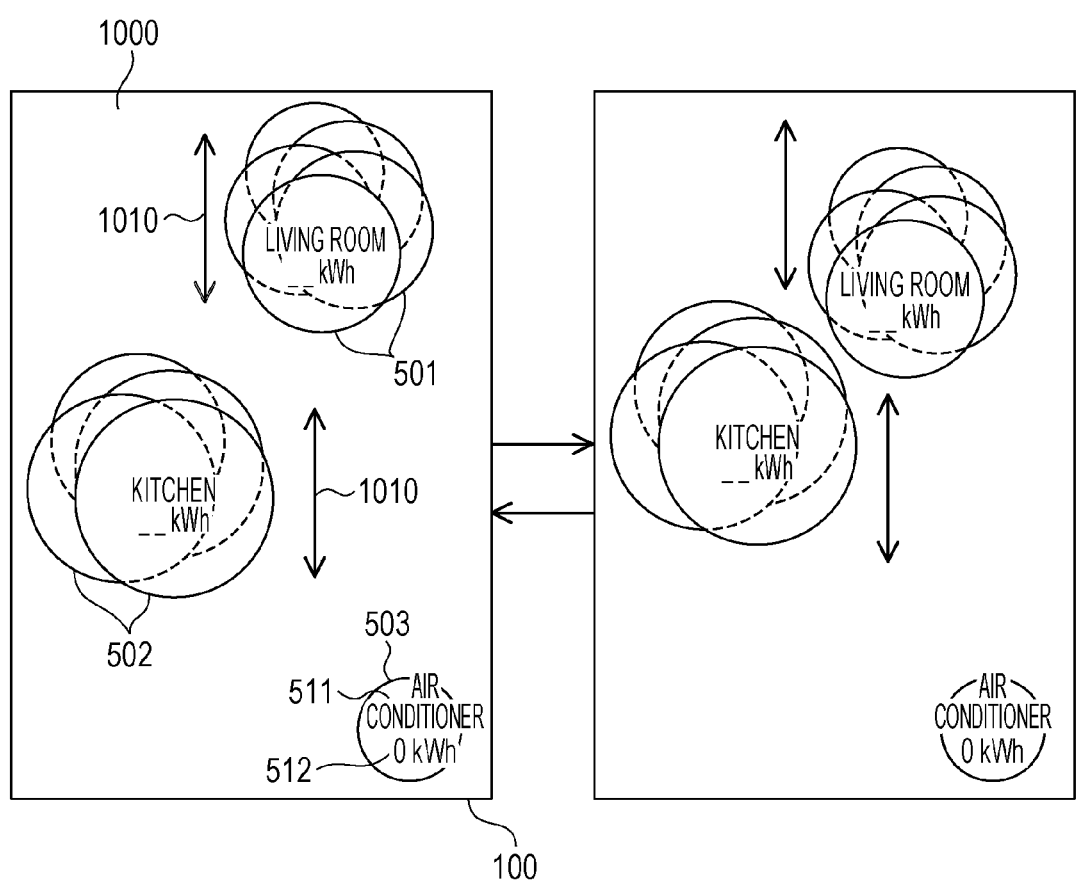
FIG. 10 is a diagram schematically illustrating another example of a home screen displayed on the display of the information device.

FIG. 10 is a diagram schematically illustrating another example of a home screen displayed on the display 101 of the information device 100. In the home screen 1000 illustrated in FIG. 10, the display control unit 103 displays display objects 501 through 503 that are the same as in the home screen 500 in FIG. 5, on the display 101 of the information device 100.

In the home screen 1000 illustrated in FIG. 10, the display control unit 103 displays any devices 200 correlated with the branch circuit of which are devices 200 that the power is on, in a state where the display objects are moving. For example, in FIG. 10, the display objects 501 and 502 of which the branch circuit names 511 are "living room" and "kitchen" respectively, are displayed in a state of moving in the up and down directions, as indicated by arrows 1010.

On the other hand, in a case where there are no devices 200 of the devices 200 correlated with the branch circuit of which the power is on, the display control unit 103 displays the display objects in a stationary state. For example, the electric power consumption display 512 displayed over the display object 503 of which the branch circuit name 511 is "air conditioner" is "0 kWh". Accordingly, the display control unit 103 displays the display object 503 is a stationary manner.

Comparing the left and right drawings in FIG. 10, it can be seen that the display objects 501 and 502 are displayed in a manner moving in the up and down directions, and the display object 503 is displayed in a stationary state. Thus, in the home screen 1000 illustrated in FIG. 10, the user can easily tell whether or not there are any devices 200 of which the power is on, just by confirming whether the display objects displayed on the display 101 are moving or not. The form by which on or off of power of the devices 200 is expressed in the home screen displayed on the display 101 of the information device 100 is not restricted to the screen illustrated in FIG. 10.

Figure 11:
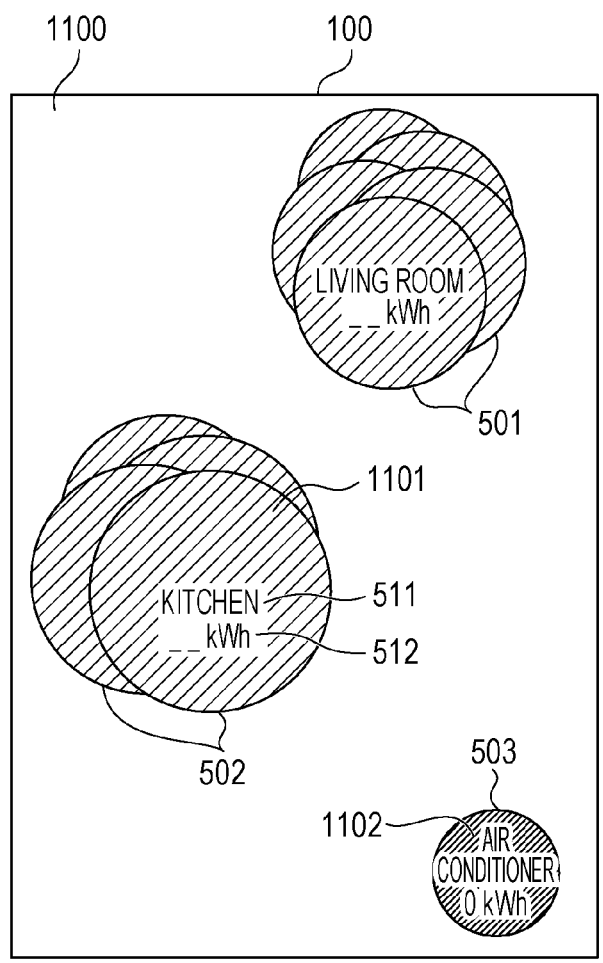
FIG. 11 is a diagram schematically illustrating yet another example of a home screen displayed on the display of the information device.

FIG. 11 is a diagram schematically illustrating yet another example of a home screen displayed on the display 101 of the information device 100. In the home screen 1100 illustrated in FIG. 11, the display control unit 103 displays display objects 501 through 503 that are the same as in the home screen 500 in FIG. 5, on the display 101 of the information device 100.

In the home screen 1100 illustrated in FIG. 11, the display control unit 103 displays any devices 200 correlated with the branch circuits of which are devices 200 that the power is on, in a color belonging to a first color group, in green 1101 for example. On the other hand, in a case where there are no devices 200 of the devices 200 correlated with the branch circuits of which the power is on, the display control unit 103 displays the display objects in a color belonging to a second color group, in gray 1102 for example.

Thus, in the home screen 1100 illustrated in FIG. 11, the user can easily tell whether or not there are any devices 200 of which the power is on, just by confirming the color of the display objects displayed on the display 101. The home screen displayed on the display 101 of the information device 100 is not restricted to the screens illustrated in FIGS. 5, 10, and 11. For example, an arrangement may be made where the magnitude of electric power consumption by the devices 200 in the branch circuits is expressed in the home screen.

Figure 12:
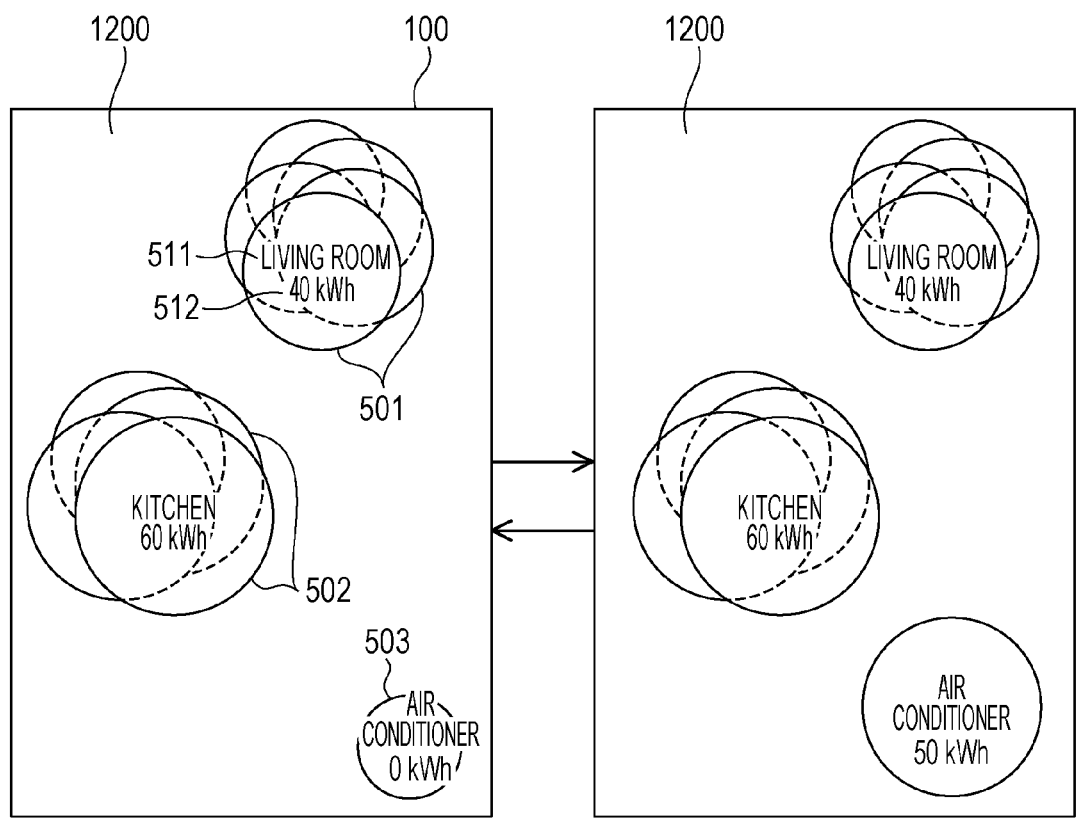
FIG. 12 is a diagram schematically illustrating yet another example of a home screen displayed on the display of the information device.

FIG. 12 is a diagram schematically illustrating yet another example of a home screen displayed on the display 101 of the information device 100. In the home screen 1200 illustrated in FIG. 12, the display control unit 103 displays display objects 501 through 503 that are the same as in the home screen 500 in FIG. 5, on the display 101 of the information device 100.

In the home screen 1200 illustrated in FIG. 12, the display control unit 103 displays, of the overlapping display objects, the display objects 501 through 503 that are at the highest hierarchical level, in such a manner that the larger the electric power consumption corresponding to the branch circuit is, the larger the display is, and the smaller the electric power consumption corresponding to the branch circuit is, the smaller the display is.

For example, in the drawing at the left in FIG. 12, the electric power consumption displays 512 corresponding to the branch circuit names 511 "living room", "kitchen", and "air conditioner", state "40 kWh", "60 kWh", and "0 kWh", respectively. That is to say, the power is off for the air conditioner 201 (FIG. 2). In this case, the radii R501 through R503 of the highest-hierarchical-level display objects 501 through 503 are R502>R501>R503.

For example, in the drawing at the right in FIG. 12, the electric power consumption displays 512 corresponding to the branch circuit names 511 "living room", "kitchen", and "air conditioner", state "40 kWh", "60 kWh", and "50 kWh", respectively. That is to say, the power is on for the air conditioner 201 (FIG. 2). In this case, the radii R501 through R503 of the highest-hierarchical-level display objects 501 through 503 are R502>R503>R501. Thus, in the home screen 1200 illustrated in FIG. 12, the user can easily tell the magnitude of electric power consumption, just by confirming the size of the display objects that are at the highest hierarchical level, displayed on the display 101.

Although the radii of the display objects that are at the highest hierarchical level are changed in accordance with the electric power consumption, the present disclosure is not restricted to this. For example, the display control unit 103 may make the overall area of the overlapping display objects to be larger the greater the electric power consumption is.

Figure 13:
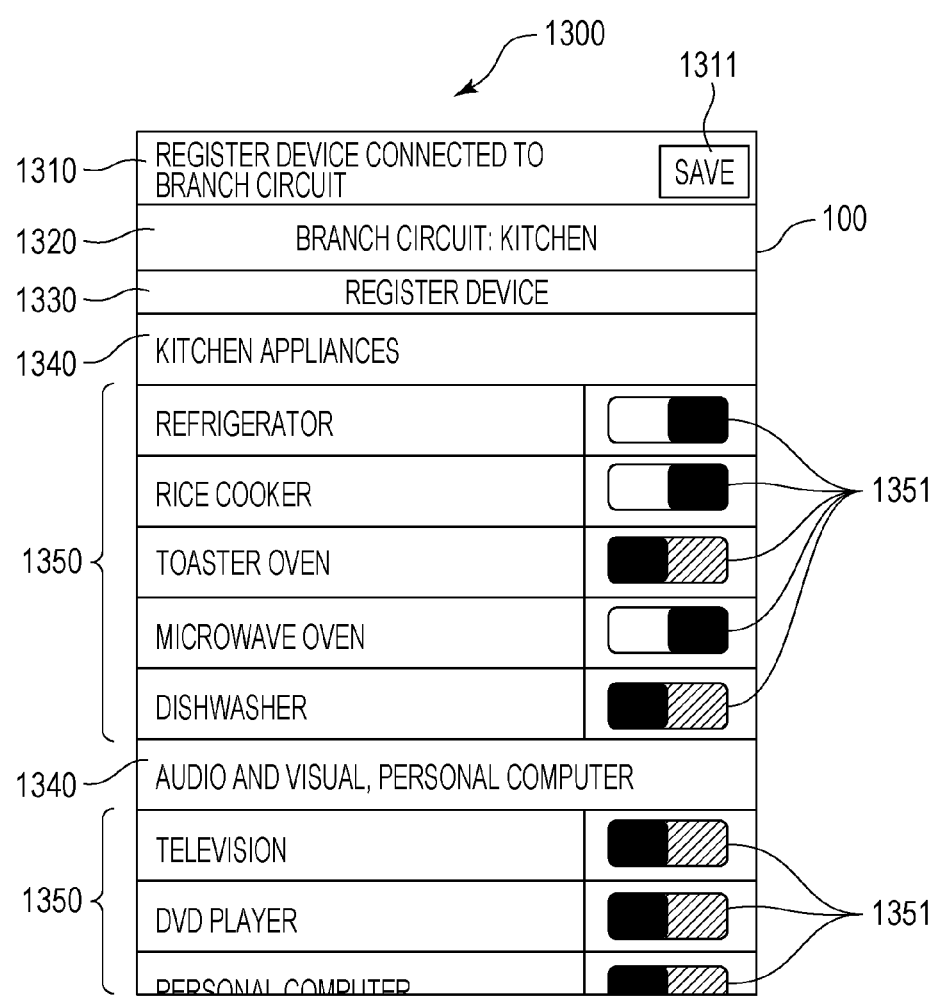
FIG. 13 is a diagram schematically illustrating an example of a setting screen displayed on the display of the information device.

FIG. 13 is a diagram schematically illustrating an example of a setting screen 1300 displayed on the display 101 of the information device 100. Upon the user tapping with the contact object 700 on the display object 524 of which the device name 531 is "device registration", the separated screen 600 illustrated in FIG. 7 at the upper right the operating unit 102 detects the tap. The display control unit 103 then switches the display screen on the display 101 of the information device 100 from the device list 1600 illustrated in FIG. 7 at the upper right to the setting screen 1300 illustrated in FIG. 13.

A heading space 1310 at the top tier of the setting screen 1300 says "REGISTER DEVICE CONNECTED TO BRANCH CIRCUIT". This expresses that this screen displayed on the display 101 of the information device 100 is a screen for correlating devices with branch circuits. A save button 1311 is provided to the right edge of the heading space 1310. The save button 1311 is for saving the registration contents shown in the setting screen 1300.

A branch circuit name space 1320 immediately below the heading space 1310 says "BRANCH CIRCUIT: KITCHEN". This expresses that the setting screen 1300 in FIG. 13 is a screen for registering devices connected to the branch circuit 443 (FIG. 2) of which the branch circuit name is "kitchen". That is to say, it can be understood that the display object 524 of which the branch circuit name 511 is "kitchen" has been tapped at the separated screen 600 at the upper right in FIG. 7, and thus transition has been made to the setting screen 1300 in FIG. 13.

A guidance space 1330 immediately below the branch circuit name space 1320 says "REGISTER DEVICE". This guidance space 1330 guides the user to register a device.

Type name space 1340 and device name space 1350 are repeatedly provided below the guidance space 1330. The type name space 1340 toward the top has the device type name "KITCHEN APPLIANCES", and the following device name space 1350 list specific device names included in the type name "KITCHEN APPLIANCES", which are "refrigerator", "rice cooker", "toaster oven", "microwave oven", and "dishwasher".

The type name space 1340 toward the bottom has the device type name "AUDIO AND VIDEO, PERSONAL COMPUTER", and the following device name space 1350 list specific device names included in the type name "AUDIO AND VIDEO, PERSONAL COMPUTER", which are "television", "DVD player", and "personal computer".

A registration button 1351 is provided to the right of each device name space 1350. The registration button 1351 is for registering the corresponding device. In the setting screen 1300 illustrated in FIG. 13, the registration buttons 1351 corresponding to the "refrigerator", "rice cooker", and "microwave oven" are on, and all other registration buttons 1351 are off.

When the user taps a registration button 1351 that is off in the setting screen 1300 illustrated in FIG. 13 with a contact object, the operating unit 102 detects the tap. The display control unit 103 then switches the registration button 1351 that is off to where it is on.

Also, when the user taps the save button 1311 with a contact object in the setting screen 1300 illustrated in FIG. 13, the operating unit 102 detects the tap. The display control unit 103 then saves the registration contents in the storage unit 104. That is to say, the display control unit 103 correlates the devices in the device name spaces 1350 of which the registration buttons 1351 are on, with the branch circuit displayed in the branch circuit name space 1320. Thereafter, the display control unit 103 may return the display screen on the display 101 from the setting screen 1300 to the separated screen 600 at the upper right in FIG. 7.

It can be seen from FIG. 2 that the refrigerator 203, rice cooker 204, and microwave oven 205 are connected to the branch circuit 443 of which the branch circuit name is "kitchen". It can be seen from the setting screen 1300 illustrated in FIG. 13 that these refrigerator 203, rice cooker 204, and microwave oven 205 are correlated with the branch circuit 443 of which the branch circuit name is "kitchen".

Now, when the user performs a predetermined operation, such as a swiping operation in the vertical direction for example, on the setting screen 1300 illustrated in FIG. 13, the operating unit 102 detects the operation. The display control unit 103 then scrolls the display screen, to where other device names that were not displayed in FIG. 13 are displayed on the display 101.

Figure 14:
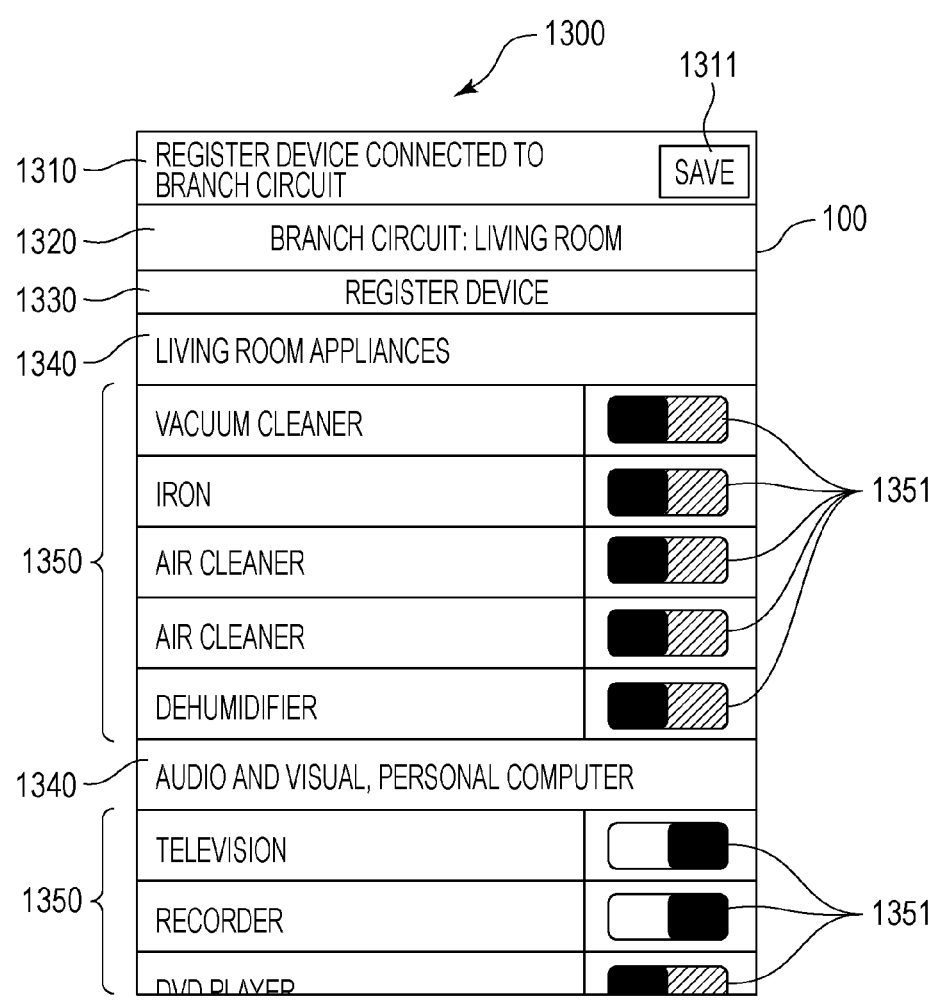
FIG. 14 is a diagram schematically illustrating another example of a setting screen displayed on the display of the information device.

FIG. 14 is a diagram schematically illustrating another example of a setting screen 1300 displayed on the display 101 of the information device 100. The branch circuit name space 1320 in the setting screen 1300 in FIG. 14 says "BRANCH CIRCUIT: LIVING ROOM". This expresses that the setting screen 1300 in FIG. 14 is a screen for registering devices connected to the branch circuit 444 (FIG. 2) of which the branch circuit name is "living room". That is to say, it can be understood that the display object 524 of which the branch circuit name 511 is "living room" has been tapped at the separated screen 610 at the lower left in FIG. 8, and thus transition has been made to the setting screen 1300 in FIG. 14.

The recorder 206 and television 207 are connected to the branch circuit 444 of which the branch circuit name is "living room", as shown in FIG. 2. On the other hand, in the setting screen 1300 illustrated in FIG. 14, the registration buttons 1351 corresponding to the device name spaces 1350 of "television" and "recorder" are on, and all other registration buttons 1351 are off. Accordingly, the setting screen 1300 in FIG. 14 shows that the recorder 206 and television 207 are correlated with the branch circuit 444 of which the branch circuit name is "living room".

Next, configuration examples of information saved in the server 300 or information device 100 will be described with reference to FIGS. 15 through 21. FIG. 15 is a diagram schematically illustrating an example of the configuration of a branch circuit list 1500 saved in the storage unit 303 of the server 300. The branch circuit list 1500 represents branch circuits connected to the distribution board 410. The display control unit 103 of the information device 100 generates the branch circuit list 1500 based on user input. The communication control unit 105 of the information device 100 transmits the branch circuit list 1500 created by the display control unit 103 to the server 300.

The communication control unit 304 of the server 300 saves the received branch circuit list 1500 in the storage unit 303. The display control unit 103 of the information device 100 may save the generated branch circuit list 1500 in the storage unit 104.

The branch circuit list 1500 includes branch circuit ID 1501, branch circuit name 1502, display priority order 1503, and number-of-registered-devices 1504, as illustrated in FIG. 15. The branch circuit ID 1501 represents identifiers identifying the branch circuits. The branch circuit name 1502 represents names given to the branch circuits. The display priority order 1503 represents the priority order of display objects displayed on the home screen 500 (FIG. 5). The number-of-registered-devices 1504 represents the number of devices that have been correlated to the branch circuits using the setting screen 1300 (FIG. 13 and FIG. 14).

In FIG. 15, the branch circuit name of the branch circuit ID "1" is "air conditioner" and the number of registered devices is "1", so it can be seen that this is the branch circuit 441 (FIG. 2). Also, the branch circuit name of the branch circuit ID "2" is "living room" and the number of registered devices is "21", so it can be seen that this is the branch circuit 444 (FIG. 2). Further, the branch circuit name of the branch circuit ID "3" is "kitchen" and the number of registered devices is "3", so it can be seen that this is the branch circuit 443 (FIG. 2).

In the branch circuit list 1500 in FIG. 15, the display priority order 1503 is "1", "2", and "3", in the order of the branch circuit name 1502 "living room", "kitchen", and "air conditioner". Consequently, the display control unit 103 displays the display objects 501, 502, and 503 on the display 101 of the information device 100 in the order of branch circuit name 511 "living room", "kitchen", and "air conditioner" in the home screen 500 illustrated in FIG. 5.

The display priority order 1503 may be set by the user. Alternatively, the frequency at which the user separates the display objects may be accumulated, with the display priority order 1503 being set in order of the frequency.

FIG. 16 is a diagram schematically illustrating an example of the configuration of a device list 1600 saved in the storage unit 303 of the server 300. The device list 1600 represents devices 200 correlated with branch circuits. The display control unit 103 of the information device 100 generates the device list 1600 based on user input using the setting screen 1300 (FIGS. 13 and 14). The communication control unit 105 of the information device 100 transmits the device list 1600 generated by the display control unit 103 to the server 300.

The communication control unit 304 of the server 300 saves the received device list 1600 in the storage unit 303. The display control unit 103 of the information device 100 may save the generated device list 1600 in the storage unit 104.

The device list 1600 includes a branch circuit ID 1601, device ID 1602, and device name 1603, as illustrated in FIG. 16. The branch circuit ID 1601 represents identifiers identifying the branch circuits. The device ID 1602 represents identifiers identifying the devices. The device name 1603 represents the names of the devices.

The devices are correlated with the branch circuits as illustrated in FIG. 2, in the device list 1600 illustrated in FIG. 16. That is to say, "air conditioner" is correlated with the branch circuit of which the branch circuit ID is "1" (the branch circuit of which the branch circuit name in FIG. 15 is "air conditioner"). "Television" and "recorder" are correlated with the branch circuit of which the branch circuit ID is "2" (the branch circuit of which the branch circuit name in FIG. 15 is "living room"). "Rice cooker", "microwave oven", and "refrigerator" are correlated with the branch circuit of which the branch circuit ID is "3" (the branch circuit of which the branch circuit name in FIG. 15 is "kitchen").

FIG. 17 is a diagram schematically illustrating an example of the configuration of an information device list 1700 saved in the storage unit 303 of the server 300. The information device list 1700 represents the information devices 100 correlated with the distribution board 410. The display control unit 103 of the information device 100 generates the information device list 1700 based on user input. The communication control unit 105 of the information device 100 transmits the information device list 1700 generated by the display control unit 103 to the server 300.

The communication control unit 304 of the server 300 saves the received information device list 1700 in the storage unit 303. The display control unit 103 of the information device 100 may save the generated information device list 1700 in the storage unit 104.

The information device list 1700 includes distribution board ID 1701, information device ID 1702, and information device type 1703. The distribution board ID 1701 represents identifiers identifying distribution boards 410. In other words, the distribution board ID 1701 represents identifiers identifying homes (households). The application 111 (FIG. 4) may include the distribution board ID 1701. The information device ID 1702 represents identifiers identifying information devices correlated with the distribution boards 410. The information device type 1703 indicates types of information devices. In the information device list 1700 in FIG. 17, "personal computer (PC)", "smartphone 1", and "smartphone 2" are correlated with the distribution board 410 of which the distribution board ID 1701 is "1".

FIGS. 18 and 19 are diagrams schematically illustrating an example of the configuration of electric power consumption information 1800 saved in the storage unit 303 of the server 300. The electric power consumption information 1800 represents information relating to electric power consumption for each branch circuit. The device control unit 302 of the server 300 generates the electric power consumption information 1800 based on the electric power consumption transmitted from the electric power management system 400. The device control unit 302 stores the generated electric power consumption information 1800 in the storage unit 303.

The electric power consumption information 1800 includes branch circuit ID 1801, date 1802, time 1803, and electric power consumption 1804, as illustrated in FIGS. 18 and 19. The branch circuit ID 1801 represents identifiers identifying branch circuits. The electric power consumption information 1800 illustrated in FIG. 18 represents information relating to the electric power consumption of the branch circuit of which the branch circuit ID is "1", and the electric power consumption information 1800 illustrated in FIG. 19 represents information relating to the electric power consumption of the branch circuit of which the branch circuit ID is "n". The device control unit 302 thus generates electric power consumption information 1800 for each branch circuit.

The date 1802 represents the year, month, and date when the electric power consumption was measured. The time 1803 represents the time at which the electric power consumption was calculated. The electric power consumption 1804 represents the accumulated value of electric power consumption at the time shown by the time 1803. The electric power consumption information 1800 illustrated in FIGS. 18 and 19 has the time 1803 arranged to every 30 minutes, so the electric power consumption 1804 represents the accumulated value for 30 minutes.

It can be seen in the electric power consumption information 1800 illustrated in FIG. 18 that the power source of at least one device correlated with the branch circuit of which the branch circuit ID is "1" has been switched from off to on between 0:00 to 0:30 on Jan. 16, 2014. It can be seen in the electric power consumption information 1800 illustrated in FIG. 19 that the power source of all devices correlated with the branch circuit of which the branch circuit ID is "n" has been switched from on to off between 0:00 on Jan. 16, 2014 to 0:30 on January 16.

In the electric power consumption information 1800 illustrated in FIGS. 18 and 19, the electric power consumption 1804 represents the accumulated value of electric power consumption for 30 minutes, and the time 1803 is every 30 minutes, but the present disclosure is not restricted to this. Alternatively, the electric power consumption 1804 may represent the accumulated value of electric power consumption for 1 minute or 5 minutes, and the time 1803 may be every 1 minute or every 5 minutes. Further, alternatively, the electric power consumption 1804 may represent the instantaneous electric power consumption with the time 1803 being every 1 minute or every 5 minutes.

FIG. 20 is a diagram schematically illustrating an example of the configuration of device state information 2000 saved in the storage unit 303 of the server 300. The device state information 2000 represents information relating to the operating state of the devices for each branch circuit. The device control unit 302 of the server 300 generates the device state information 2000 based on the electric power consumption information 1800. The device control unit 302 saves the generated device state information 2000 in the storage unit 303.

The communication control unit 304 of the server 300 may transmit the device state information 2000 generated by the device control unit 302 to the information device 100. The communication control unit 105 of the information device 100 may save the received device state information 2000 in the storage unit 104.

The device state information 2000 includes branch circuit ID 2001 and operational state 2002, as illustrated in FIG. 20. The branch circuit ID 2001 represents identifiers identifying branch circuits. The operational state 2002 represents operation states of the devices 200 correlated with the branch circuits represented by the branch circuit ID 2001. The operational state 2002 is set to "OFF" when none of the devices 200 correlated with a branch circuit represented by the branch circuit ID 2001 are operating. The operational state 2002 is set to "ON" when at least one of the devices 200 correlated with a branch circuit represented by the branch circuit ID 2001 is operating.

In the device state information 2000 in FIG. 20, the operational state of the branch circuit of which the branch circuit ID is "1" (the branch circuit of which the branch circuit name is "air conditioner" in FIG. 15) is "OFF". Accordingly, the device state information 2000 in FIG. 20 indicates that the air conditioner 201 is not operating.

Also, the operational state of the branch circuit of which the branch circuit ID is "2" (the branch circuit of which the branch circuit name is "living room" in FIG. 15) is "ON". Accordingly, the device state information 2000 in FIG. 20 indicates that at least one of the recorder 206 and television 207 is operating. Also, the operational state of the branch circuit of which the branch circuit ID is "3" (the branch circuit of which the branch circuit name is "kitchen" in FIG. 15) is "ON". Accordingly, the device state information 2000 in FIG. 20 indicates that at least one of the refrigerator 203, rice cooker 204, and microwave oven 205 is operating.

FIG. 21 is a diagram schematically illustrating an example of the configuration of display control information 2100 saved in the storage unit 104 of the information device 100. The display control information 2100 represents information relating to a GUI for display of electric power consumption, at the time of displaying the home screen on the display 101 of the information device 100. The display control unit 103 performs display control of the home screen 1000 (FIG. 10) and so forth using the display control information 2100.

The display control information 2100 is created beforehand. The pre-created display control information 2100 is saved in the storage unit 104 of the information device 100 beforehand. The display control information 2100 may be saved in the storage unit 303 of the server 300 beforehand as well. Note that the application 111 (FIG. 4) may include the display control information 2100 created beforehand.

The display control information 2100 includes operational state 2101, movement information 2102, color information 2103, and size index 2104. "ON" and "OFF" are set as the operational state 2101 in the display control information 2100. The movement information 2102, color information 2103, and size index 2104, are determined beforehand in accordance with the "ON" and "OFF" of the operational state 2101.

The operational state 2101 is the same as the operational state 2002 in the device state information 2000 illustrated in FIG. 20. That is to say, the operational state 2101 is set to "OFF" when none of the devices 200 correlated with a branch circuit represented by the branch circuit ID 2001 are operating. The operational state 2101 is set to "ON" when at least one of the devices 200 correlated with a branch circuit represented by the branch circuit ID 2001 is operating.

In the display control information 2100 illustrated in FIG. 21, the movement information 2102 is set to "moving" in accordance with the operational state 2101 being "ON", and the movement information 2102 is set to "stopped" in accordance with the operational state 2101 being "OFF". The display control unit 103 displays the home screen 1000 illustrated in FIG. 10 on the display 101 using the movement information 2102 of this the display control information 2100.

Also, in the display control information 2100 illustrated in FIG. 21, the color information 2103 is set to "green" in accordance with the operational state 2101 being "ON", and the color information 2103 is set to "gray" in accordance with the operational state 2101 being "OFF". The display control unit 103 displays the home screen 1100 illustrated in FIG. 11 on the display 101 using the color information 2103 of this the display control information 2100.

Also, in the display control information 2100 illustrated in FIG. 21, the size index 2104 is set to "2" in accordance with the operational state 2101 being "ON", and the size index 2104 is not set in accordance with the operational state 2101 being "OFF". The display control unit 103 displays the home screen 1200 illustrated in FIG. 12 on the display 101 of the information device 100 using the size index 2104 of this the display control information 2100.

When displaying the home screen 1200 illustrated in FIG. 12 on the display 101, the display control unit 103 calculates the radius [mm] of the circles for the display objects 501 through 503 at the highest hierarchical level in a case where the electric power consumption is not 0, using the electric power consumption [kWh] and size index according to the following Expression (1).

$$\text{Radius}=\text{electric power consumption}\times\text{size index}\times\frac{1}{10} \quad (1)$$

Note that in a case where the electric power consumption is 0, i.e., the operational state 2101 is "OFF", the display control unit 103 sets the radii of the circles at the highest hierarchical level for the display objects 501 through 503 to a fixed value.

Figure 22:
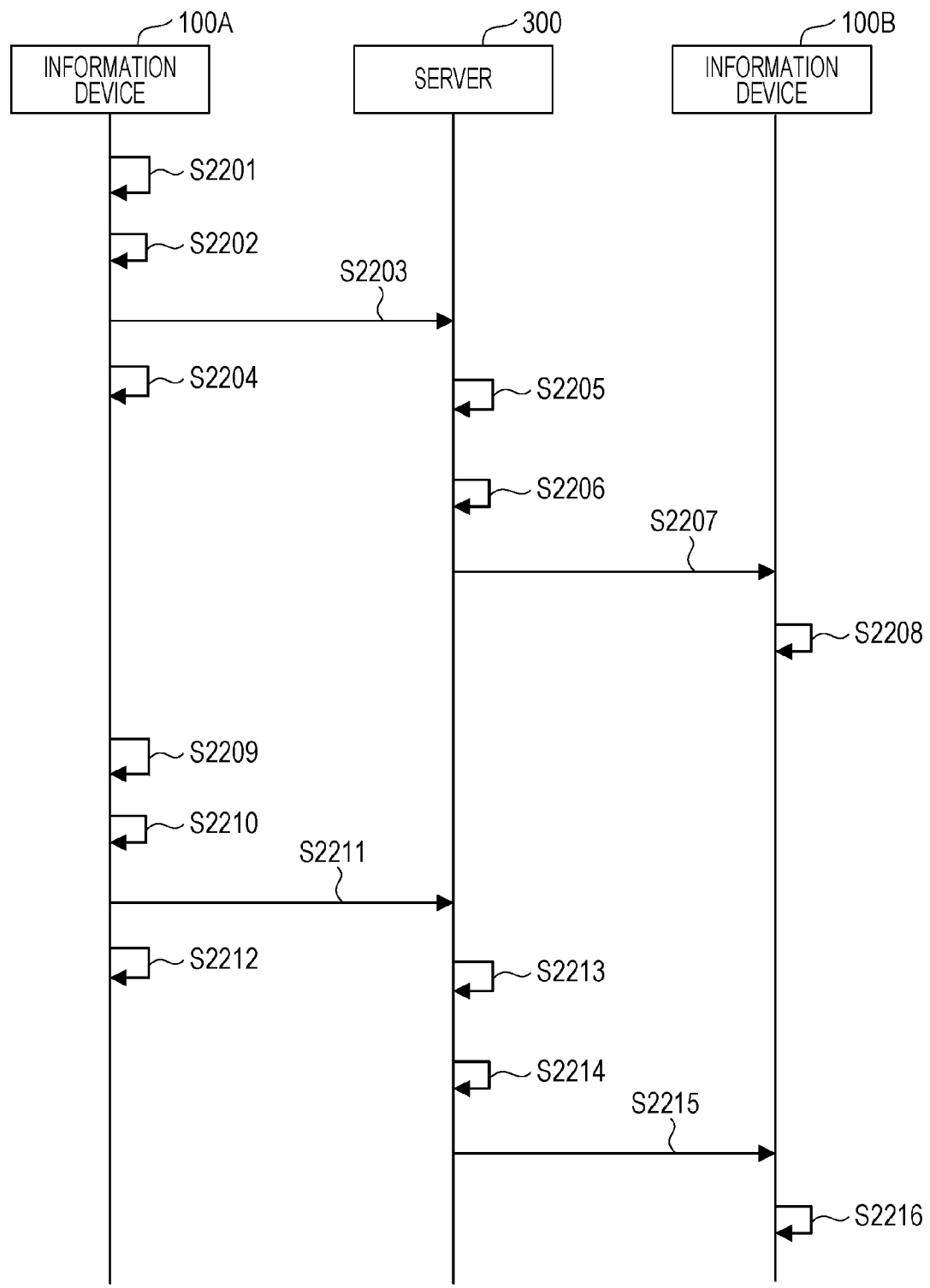
FIG. 22 is a sequence diagram schematically illustrating an example of the flow of processing, in registration operations to correlate a device, connected to a branch circuit, to that branch circuit, in the overall home control system.

Next, the flow of registration processing for correlating devices 200 connected to branch circuits to these branch circuits will be described with reference to FIGS. 22 through 25. FIG. 22 is a sequence diagram schematically illustrating an example of the flow of processing, in registration operations to correlate a device 200, connected to a branch circuit, to that branch circuit, in the overall home control system. In FIG. 22, an information device 100A (e.g., a smartphone) and an information device 100B (e.g., a PC) are connected to the same distribution board 410 (FIG. 2). Also, the device list 1600 (FIG. 16) is saved in both the server 300 and information devices 100 in FIG. 22.

At the information device 100A, the user uses the setting screen 1300 illustrated in FIG. 13 to perform registration work of the devices 200 connected to the branch circuit of which the branch circuit name is "kitchen" (S2201). Upon the save button 1311 being tapped by the user in the setting screen 1300, the display control unit 103 updates the device list 1600 (FIG. 16) saved in the storage unit 104 (S2202). The communication control unit 105 transmits the updated device list 1600 to the server 300 (S2203).

The display control unit 103 updates the display screen on the display 101, by generating a home screen and displaying on the display 101 and so forth (S2204). The updating of the display screen on the display 101 includes updating of all information, such as for example, registration of a newly purchased device 200, updating of electric power consumption, updating of operational states of devices 200, and so forth. This point is true regarding updating of the display screen in the other sequence diagrams described later.

At the server 300, the management unit 301 updates the device list 1600 saved in the storage unit 303 using the device list 1600 transmitted from the information device 100A (S2205). The management unit 301 acquires the information device 100B correlated with the same distribution board 410 (FIG. 2) as the information device 100A, from the information device list 1700 (FIG. 17) saved in the storage unit 303 (S2206). The communication control unit 304 transmits the updated device list 1600 to the information device 100B (S2207).

At the information device 100B, the communication control unit 105 updates the device list 1600 saved in the storage unit 104 using the device list 1600 transmitted from the server 300 (S2208).

Next, at the information device 100A, the user uses a separate setting screen 1300 illustrated in FIG. 14 to perform registration work of the devices 200 connected to the branch circuit of which the branch circuit name is "living room" (S2209). Upon the save button 1311 being tapped by the user in the setting screen 1300, the display control unit 103 updates the device list 1600 (FIG. 16) saved in the storage unit 104 (S2210). The communication control unit 105 transmits the updated device list 1600 to the server 300 (S2211).

The display control unit 103 updates the display screen on the display 101, by generating a home screen and displaying on the display 101 and so forth (S2212). The updating of the display screen on the display 101 includes updating of all information, such as for example, registration of a newly purchased device 200, updating of electric power consumption, updating of operational states of devices 200, and so forth.

At the server 300, the management unit 301 updates the device list 1600 saved in the storage unit 303 using the device list 1600 transmitted from the information device 100A (S2213). The management unit 301 acquires the information device 100B correlated with the same distribution board 410 (FIG. 2) as the information device 100A, from the information device list 1700 (FIG. 17) saved in the storage unit 303 (S2214). The communication control unit 304 transmits the updated device list 1600 to the information device 100B (S2215).

At the information device 100B, the communication control unit 105 updates the device list 1600 saved in the storage unit 104 using the device list 1600 transmitted from the server 300 (S2216).

The device list 1600 saved in the storage unit 104 of the information device 100A, the device list 1600 saved in the storage unit 303 of the server 300, and the device list 1600 saved in the storage unit 104 of the information device 100B, are synchronized with each other by the procedures illustrated in FIG. 22.

Figure 23:
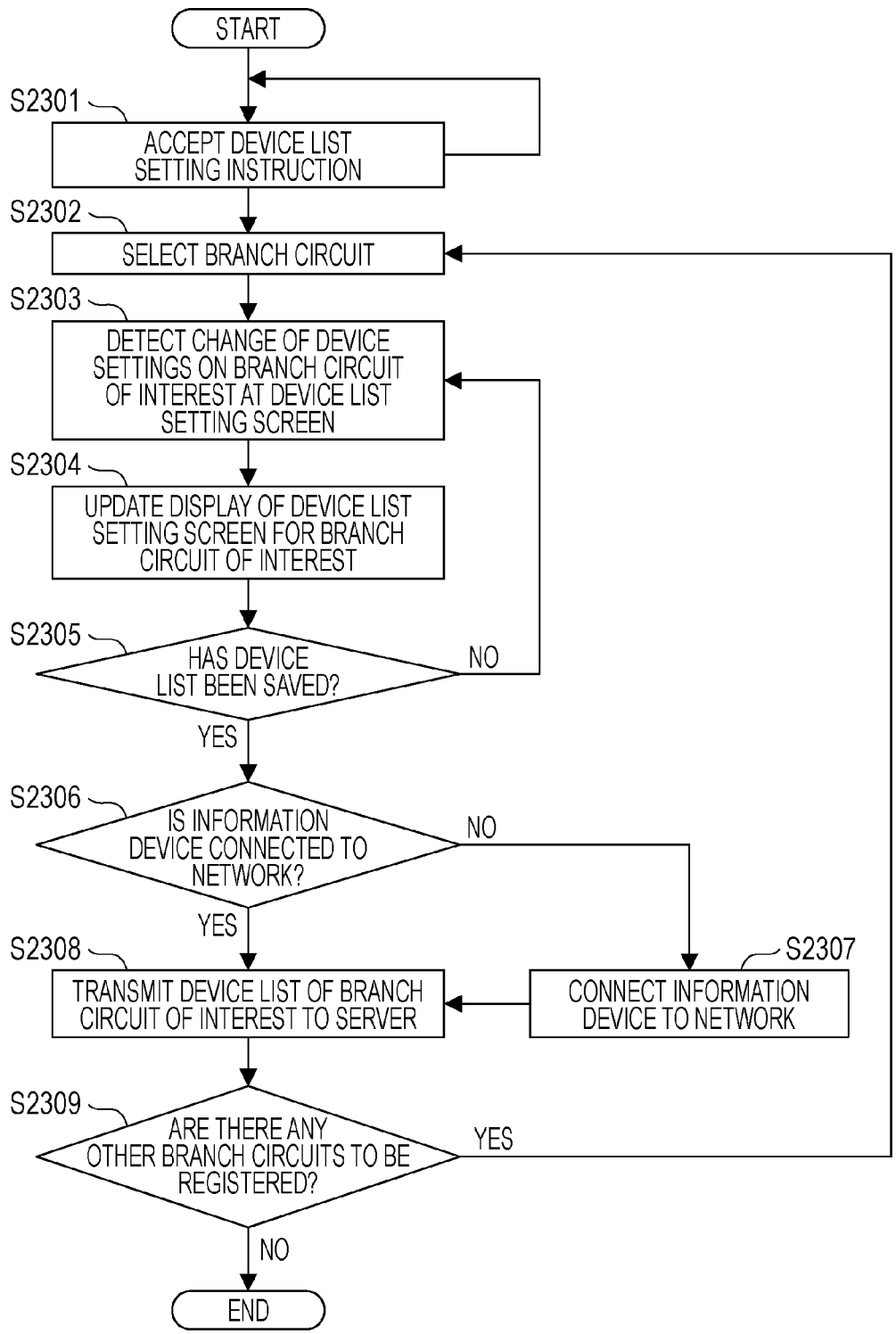
FIG. 23 is a flowchart schematically illustrating an example of the flow of processing at the information device, in the registration operations illustrated in FIG. 22.

FIG. 23 is a flowchart schematically illustrating an example of the flow of processing at the information device 100A, in the registration operations illustrated in FIG. 22. When the application 111 (FIG. 4) is used for the first time, neither branch circuit list 1500 (FIG. 15) nor device list 1600 (FIG. 16) has been created. Accordingly, when the user activates the application 111 (FIG. 4) for the first time, the display control unit 103 displays an initial settings screen (omitted from illustration) on the display 101 instead of the home screen 500 (FIG. 5).

Upon the user first selecting an instruction button instructing a branch circuit list to be created at the initial settings screen, the operating unit 102 detects the selection. The display control unit 103 then displays a menu screen (omitted from illustration) for creating a branch circuit list on the display 101. The user creates the branch circuit list 1500 (FIG. 15) by performing operations following the menu screen.

Next, upon the user first selecting an instruction button instructing a device list to be created at the initial settings screen, the operating unit 102 detects the selection. The display control unit 103 then receives the instruction, and displays a selection list screen for selecting a branch circuit (e.g., a display screen including the branch circuit list 1500 in FIG. 15) on the display 101 (S2301).

The user selects the branch circuit for the device to be registered from the selection list screen (S2302). The operating unit 102 then detects that selection, and the display control unit 103 displays the setting screen 1300 (FIGS. 13 and 14) for the branch circuit regarding which the device list is to be registered on the display 101, in accordance with the results of the detection.

Upon the user selecting a registration button 1351 which is off in the setting screen 1300, the operating unit 102 detects that selection (S2303). The display control unit 103 then updates the display of the registration button 1351 in the setting screen 1300 from the off state to the on state, in accordance with the detection results (S2304).

Next, the operating unit 102 judges whether or not the device list 1600 has been saved in the storage unit 104, based on whether or not the save button 1311 in the setting screen 1300 has been operated (S2305). If the save button 1311 has not been tapped by the user, the operating unit 102 does not judge that the device list 1600 has been saved in the storage unit 104 (NO in S2305), the processing is returned to S2303, and the processing of S2303 through S2305 is repeated.

On the other hand, when the save button 1311 is tapped by the user, the operating unit 102 judges that the device list 1600 has been saved in the storage unit 104 (YES in S2305), and the communication control unit 105 judges whether or not the information device 100A is connected to the network (S2306). If the information device 100A is connected to the network (YES in S2306), the processing advances to S2308. On the other hand, if the information device 100A is not connected to the network (NO in S2306), the information device 100A is connected to the network (S2307) and the processing advances to S2308.

In S2308, the communication control unit 105 transmits transmission data including the device list 1600 of the updated branch circuit that is the object of the settings to the server 300. Note that this transmission data includes, in the header for example, information relating to the distribution board ID (FIG. 17) to which the information device 100A belongs.

If S2305 yields YES, the display control unit 103 switches the display screen on the display 101 from the setting screen 1300 to the selection list screen.

If the user desires to register another branch circuit (YES in S2309), the branch circuit is selected from the selection list screen (S2302), and the above processing is repeated. If the user does not desire to register another branch circuit (NO in S2309), the processing of FIG. 23 is ended by tapping on an end button of the selection list screen, for example.

Figure 24:
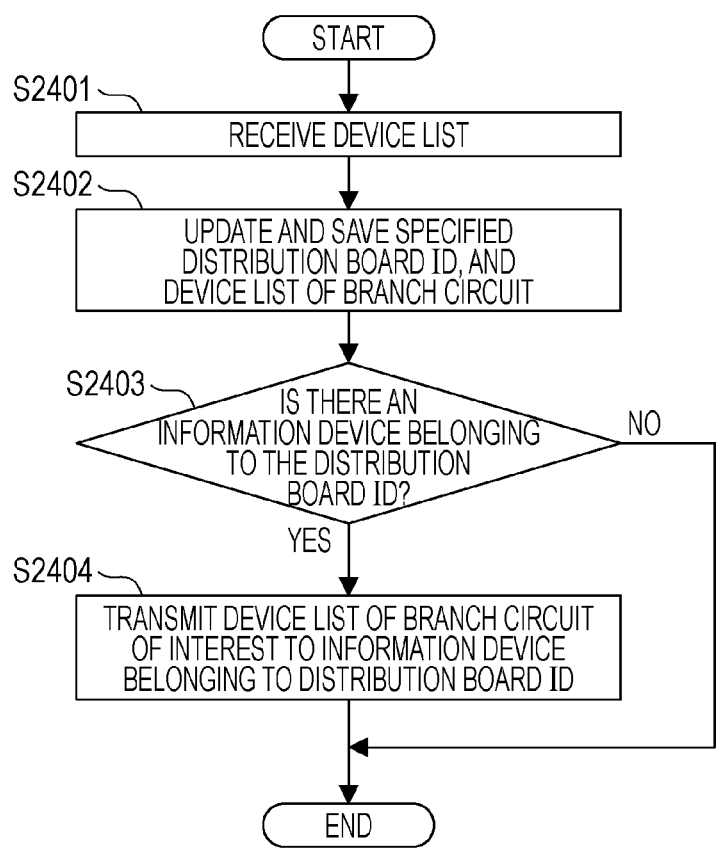
FIG. 24 is a flowchart schematically illustrating an example of the flow of processing at the server, in the registration operations illustrated in FIG. 22.

FIG. 24 is a flowchart schematically illustrating an example of the flow of processing at the server 300, in the registration operations illustrated in FIG. 22. First, the communication control unit 304 receives transmission data including the device list 1600 transmitted from the information device 100A (S2401). The management unit 301 searches for the device list 1600 saved in the storage unit 303 from the distribution board ID included in the received transmission data and the branch circuit ID included in the device list 1600, and updates the device list 1600 that has been found with the device list 1600 that has been received, and saves (S2402).

The management unit 301 judges from the information device list 1700 saved in the storage unit 303 whether another information device belonging to the distribution board ID included in the received transmission data exists (S2403). If no other information device belonging to the distribution board ID exists (NO in S2403), the processing of FIG. 24 ends.

If another information device belonging to the distribution board ID exists (YES in S2403), the communication control unit 304 transmits the device list 1600 transmitted by the information device 100A to that information device (S2404), and the processing of FIG. 24 ends. In this embodiment, there exists the information device 100B belonging to the same distribution board ID as the information device 100A. Accordingly, in S2404 the communication control unit 304 transmits the device list 1600 to the information device 100B.

Figure 25:
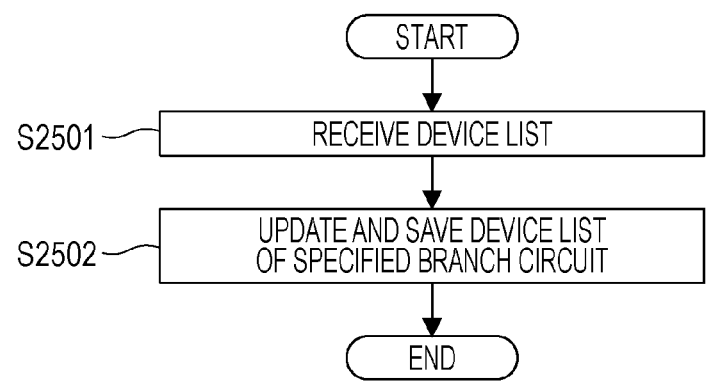
FIG. 25 is a flowchart schematically illustrating an example of the flow of processing at another information device, in the registration operations illustrated in FIG. 22.

FIG. 25 is a flowchart schematically illustrating an example of the flow of processing at the information device 100B, in the registration operations illustrated in FIG. 22. First, the communication control unit 105 receives the device list 1600 transmitted from the server 300 (S2501). The communication control unit 105 searches for the device list 1600 saved in the storage unit 104 from the branch circuit ID included in the received device list 1600, updates the device list 1600 that has been found with the device list 1600 that has been received, and saves (S2502). The processing of FIG. 25 thus ends.

Figure 26:
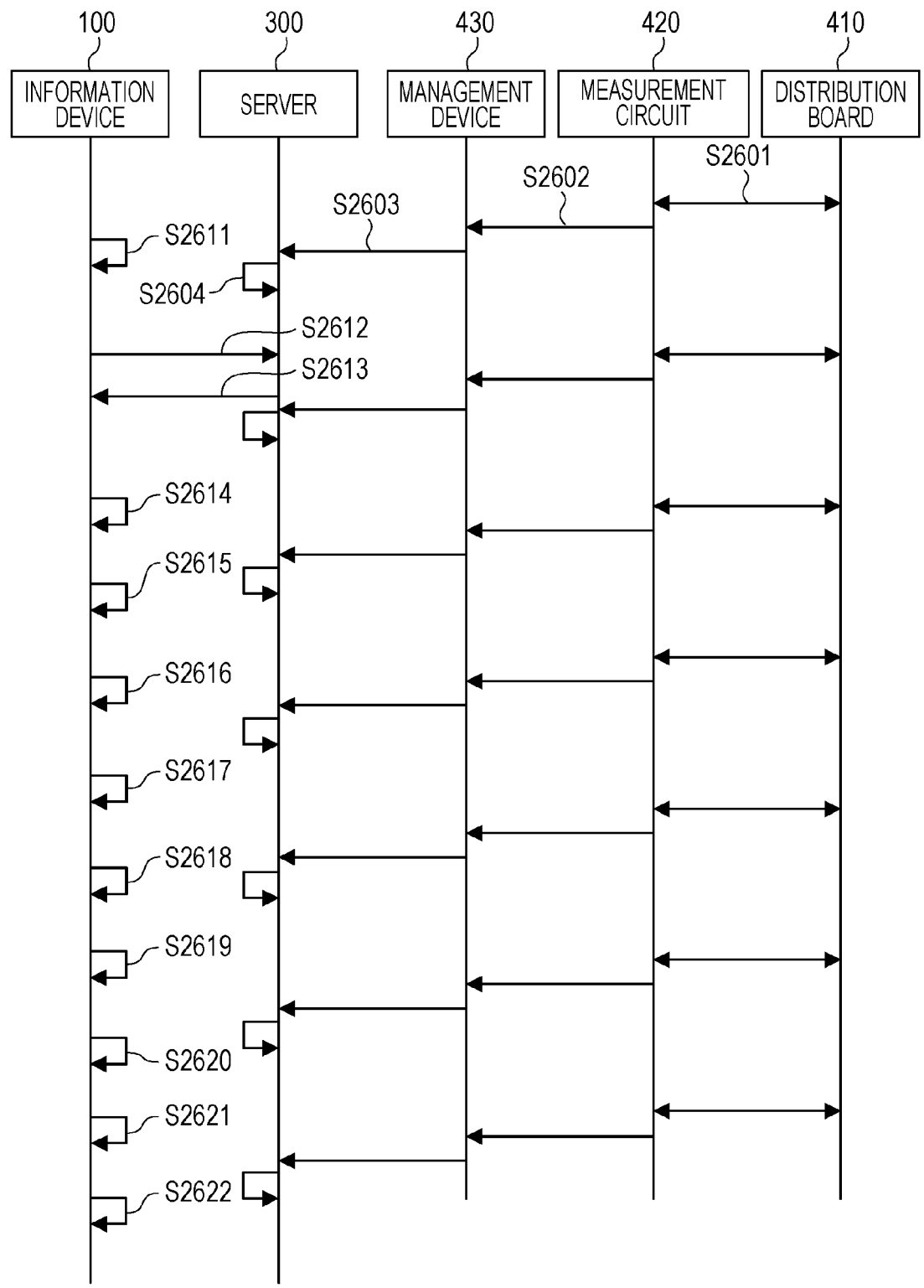
FIG. 26 is a sequence diagram schematically illustrating an example of the flow of processing to display electric power consumption on the display of the information device, in the overall home control system.

The flow of processing for displaying electric power consumption on the display 101 of the information device 100 will be described with reference to FIGS. 26 through 28. FIG. 26 is a sequence diagram schematically illustrating an example of the flow of processing to display electric power consumption on the display 101 of the information device 100, in the overall home control system.

The electric power consumption measurement circuit 421 (FIG. 2) of the measurement device 420 measures the electric power consumption for each branch circuit of the distribution board 410 (S2601). The communication control circuit 422 (FIG. 2) of the measurement device 420 transmits the electric power consumption measured by the electric power consumption measurement circuit 421 to the management device 430 (S2602). The communication control unit 434 of the management device 430 transmits the electric power consumption, transmitted from the measurement device 420, to the server 300 (S2603). The management unit 301 of the server 300 saves the electric power consumption transmitted management device 430 in the storage unit 303 (S2604).

S2601 through S2604 may be executed periodically at set intervals, for example. S2601 through S2604 may also be executed asynchronously with the processing of S2611 and thereafter.

Although S2601 through S2604 are executed at the same frequency in FIG. 26, this does not have to be the same frequency, For example, an alternative arrangement may be made where the electric power consumption measurement circuit 421 of the measurement device 420 measures electric power consumption each 1 minute (S2601), the communication control circuit 422 of the measurement device 420 accumulates the measured electric power consumption, and transmits the accumulated value every 30 minutes (S2602).

A further alternative arrangement may be made, for example, where the electric power consumption measurement circuit 421 of the measurement device 420 measures electric power consumption each 1 minute (S2601), the communication control circuit 422 of the measurement device 420 transmits the measured electric power consumption each 1 minute (S2602), the device control unit 432 of the management device 430 accumulates the received electric power consumption, and the communication control unit 434 of the management device 430 transmits the accumulated value every 30 minutes (S2603).

At the information device 100, the display control unit 103 accepts a display request for the home screen 500 (FIG. 5), due to activation of the application 111 for example (S2611). The communication control unit 105 requests the server 300 for electric power consumption of the branch circuit to be displayed (S2612).

In S2612, the communication control unit 105 may request the electric power consumption of the three branch circuits of which the branch circuit IDs 1501 are "2", "1", and "3", which have display priority order 1503 (FIG. 15) of "1", "2", "3", taking into consideration the display area of the display 101. Alternatively, the communication control unit 105 may request the electric power consumption for all branch circuits in S2612, taking into consideration the fact that scrolling operations will be performed on the display 101.

At the server 300, the communication control unit 304 extracts the electric power consumption of the requested branch circuit from the storage unit 303, of the branch circuit and transmits the electric power consumption (an example of state information) that has been extracted to the information device 100 (S2613). In this case, the communication control unit 304 may calculate the accumulated value over a certain time (e.g., one hour, 24 hours, etc.) immediately before having received the request, and transmit the accumulated values that have been calculated to the information device 100.

A tap operation is performed by the user at the information device 100 (S2614). The operating unit 102 detects the tap operation performed by the user (S2615). The operating unit 102 calculates the position of the detected tap operation (S2616). The operating unit 102 judges that this is an operation to separate overlapping display objects, for example, based on the calculated position of the tap operation (S2617), and also detects the branch circuit that has been tapped (S2618).

The operating unit 102 requests the display control unit 103 for an update of the display screen of the display 101 (S2619). The display control unit 103 references the device list 1600 (FIG. 16) registered to the branch circuit detected in S2618 (S2620).

The display control unit 103 creates a separated screen 600 (FIG. 6) where the display objects have been separated, for example (S2621). The display control unit 103 updates the display screen of the display 101 by the separated screen 600 that has been created (S2622).

Figure 27:
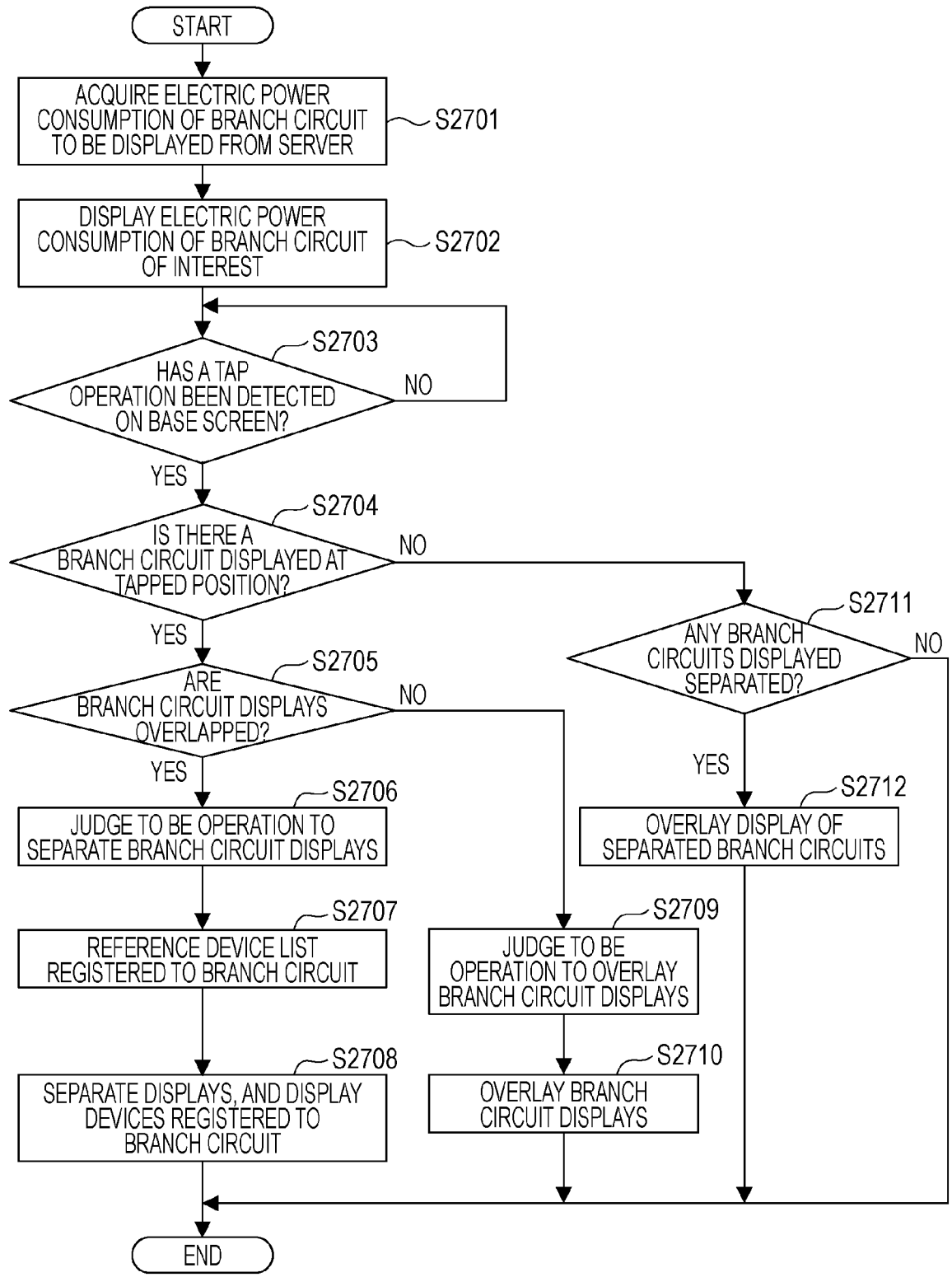
FIG. 27 is a flowchart schematically illustrating an example of the flow of processing to display electric power consumption on the display at the information device.

FIG. 27 is a flowchart schematically illustrating an example of the flow of processing to display electric power consumption on the display 101, at the information device 100. The communication control unit 105 receives the electric power consumption for the branch circuit to be displayed, that has been transmitted from the server 300 (S2701). The display control unit 103 displays the electric power consumption for the branch circuit to be displayed, that has been received, on the display 101 (S2702). In a case where the display objects 501 are displayed overlapped as illustrated in FIG. 6, the electric power consumption is also displayed overlapped, and in a case where the display objects 521 through 524 are displayed in a separated manner, the electric power consumption is displayed right next to the display objects 521 through 524.

Next, the operating unit 102 detects whether or not the user has performed a tap operation in the home screen 500 (FIG. 5) or separated screen 600 (FIG. 6) (S2703). In a case where the user has not performed a tap operation (NO in S2703), the flow stands by. On the other hand, in a case where the user has performed a tap operation (YES in S2703), the operating unit 102 judges whether or not a display object of a branch circuit exists at the tap position (S2704).

In a case where a display object of a branch circuit exists at the tap position (YES in S2704), the display control unit 103 judges whether or not the display objects of the branch circuit at the tap position are overlapped (S2705).

If the display objects of the branch circuit at the tap position are overlapped (YES in S2705, upper left in FIG. 7), the display control unit 103 judges that the tap operation detected by the operating unit 102 is an operation to separate the display objects of the branch circuit (S2706). The display control unit 103 references the device list 1600 (FIG. 16) corresponding to the branch circuit at the tap position (S2707).

The display control unit 103 separates the display objects of the branch circuit at the tap position, and displays the devices registered to the branch circuit, in a manner overlapping on the separated display objects (S2708). In this case, the display control unit 103 may display the device names 531 alone, as illustrated in FIG. 6. Alternatively, the display control unit 103 may display both the device names 531 and the device icons 532, as illustrated in FIG. 7 at the upper right.

If the display objects of the branch circuit at the tap position are separated in S2705 (NO in S2705, (ii) at the lower right in FIG. 7), the display control unit 103 judges that the tap operation detected by the operating unit 102 is an operation to overlap the display objects of the branch circuit (S2709). The display control unit 103 overlaps the display objects of the branch circuit at the tap position (S2710, lower left in FIG. 7), and the processing of FIG. 27 ends.

If no display object of a branch circuit exists at the tap position in S2704 (NO in S2704), the display control unit 103 judges whether or not there exist separated display objects of a branch circuit (S2711). If no separated display objects of a branch circuit exist (NO in S2711), the processing of FIG. 27 ends.

On the other hand, if there exist separated display objects of a branch circuit (YES in S2711, lower right in FIG. 7), the display control unit 103 overlaps the separated display objects of the branch circuit (S2712, lower left in FIG. 7), and the processing of FIG. 27 ends.

Figure 28:
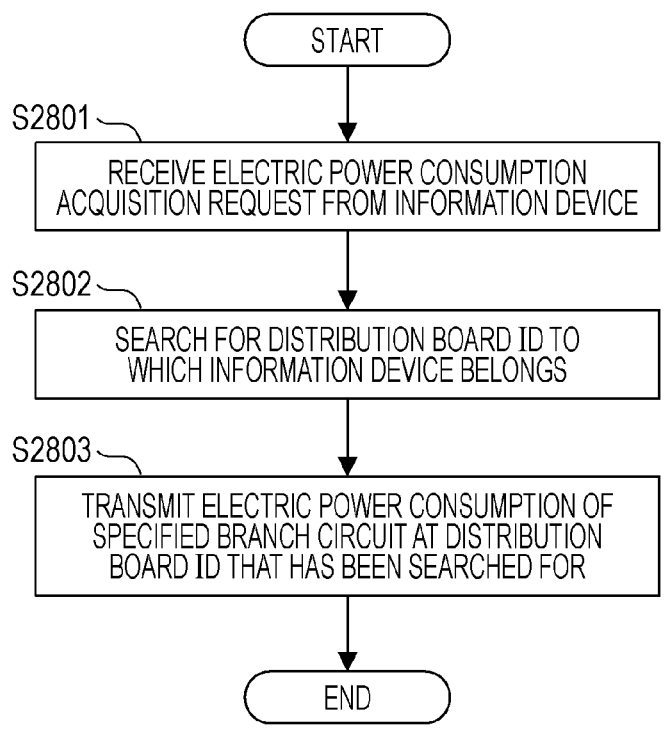
FIG. 28 is a flowchart schematically illustrating an example of the flow of processing to display electric power consumption on the display of the information device, at the server.

FIG. 28 is a flowchart schematically illustrating an example of the flow of processing to display electric power consumption on the display 101 of the information device 100, at the server 300. The communication control unit 304 receives a request for electric power consumption of the branch circuit to be displayed, transmitted from the information device 100 (S2801). The header, for example, of transmission data representing this request, includes the distribution board ID identifying the distribution board 410 with which the transmitting information device 100 has been correlated.

The management unit 301 searches the within the storage unit 303 for the distribution board ID included in the request (S2802). The communication control unit 304 extracts the electric power consumption of the branch circuit to be displayed, that corresponds to the distribution board ID that has been found, transmits the extracted electric power consumption to the information device 100 (S2803), and the processing of FIG. 28 ends.

The present disclosure is useful as a control method, program, and information device, to suitably display electric power consumption to a user.

What is claimed is:

1. A control method of an information device, comprising:
   acquiring state information from a distribution board system via a network, the distribution board system including a plurality of branch circuits, including a first branch circuit of a first plurality of devices, the state information indicating electric power consumption in each of the plurality of branch circuits;
   displaying, on a touch panel display, a first interface of the distributing board system, the first interface comprising:
   a partially overlapped first plurality of display objects representing the first branch circuit of the first devices, wherein each of the first plurality of display objects corresponds to one of the first devices of the first branch circuit, and each of the first plurality of display objects is displayed in a predetermined shape overlapping each other, with a portion of each of the first plurality of display objects being visible from the partially overlapped first plurality of display objects; and
   first electric power information indicating first electric power consumption of the first branch circuit, displayed over the partially overlapped first plurality of display objects, such that the first electric power information is indicated for the first branch circuit;
   in response to a first tapping operation on the partially overlapped first plurality of display objects being detected, causing the first interface to change to a second interface comprising:
   the partially overlapped first plurality of display objects being separated by displaying a visible portion of each of the first plurality of display objects larger than the visible portion of each of the first plurality of display objects displayed in the first interface, and
   first electric power information corresponding to the first plurality of display objects displayed at a location other than the separated first plurality of display objects; and,
   a device information image representing one of the first plurality of devices displayed on each of the separated first plurality of display objects; and
   in response to a second tapping operation on one of the separated first plurality of display objects being detected, causing the displayed second interface to change back to the first interface.

2. The control method according to claim 1, further comprising:
   removing the first electric power information displayed on the predetermined shapes of the overlapped first plurality of display objects, when the first tapping operation is detected.

3. The control method according to claim 1, further comprising:
   moving the overlapped predetermined shapes of the first plurality of display objects displayed on the touch panel display, when it is determined, using the state information, that at least one of the first devices is in an ON state.

4. The control method according to claim 3, further comprising:
   displaying the overlapped predetermined shapes of the first plurality of display objects without movement, when it is determined, using the state information, that all of the first devices are in an OFF state.

5. The control method according to claim 1, further comprising:
   displaying the overlapped predetermined shapes of the first plurality of display objects with a color belonging to a first color group, when it is determined, using the state information, that at least one of the first devices is in an ON state.

6. The control method according to claim 5, further comprising:
   displaying the overlapped predetermined shapes of the first plurality of display objects with a color belonging to a second color group, which is different from the first color group, when it is determined, using the state information, that all of the first devices are in an OFF state.

7. The control method according to claim 1, wherein the overlapped predetermined shapes of the first plurality of display objects are displayed larger, when the first electric power consumption is larger.

8. The control method according to claim 7,
   wherein the plurality of branch circuits include a second branch circuit associated with a second plurality of devices which are different from the first plurality of devices associated with the first branch circuit,
   the control method further comprising:
   displaying, on the touch panel display, a third interface of the distribution board system, the third interface comprising: a partially overlapped second plurality of display objects representing the second branch circuit of the second plurality of devices, wherein each of the second plurality of display objects corresponds to one of the second devices of the second branch circuit, and each of the second plurality of display objects is displayed in a predetermined shape overlapping each other, with a portion of each of the second plurality of display objects being visible from the partially overlapped second plurality of display objects; and second electric power information indicating second electric power consumption of the second branch circuit, such that the second electric power information is displayed over the partially overlapped predetermined shapes of the second plurality of display objects, and wherein the overlapped predetermined shapes of the second plurality of display objects are displayed larger, when the second electric power consumption is larger.

9. The control method according to claim 1, further comprising:
changing positions of the separated predetermined shapes of the first plurality of display objects such that the entirety of the separated predetermined shapes of the first plurality of display objects are displayed on the touch panel display, when the separated predetermined shapes of the first plurality of display objects are only partially displayed on the touch panel display, in response to the first tapping operation.

10. The control method according to claim 1, further comprising:
causing the separated predetermined shapes of the first plurality of display objects to be overlapped with each other, when a scroll operation is detected on the touch panel display that displays the separated predetermined shapes of the first display objects.

11. The control method according to claim 1, wherein the device information image represents an image of one of the first devices.

12. The control method according to claim 1, wherein the distribution board system further includes a distribution board that distributes external electric power to the plurality of branch circuits, and a measurement device that measures the electric power consumption in each of the plurality of branch circuits.

13. The control method according to claim 1, wherein the distribution board system further includes a distribution board that distributes external electric power to the plurality of branch circuits, and that measures electric power consumption in each of the plurality of branch circuits.

14. The control method according to claim 1, further comprising:
in response to a third tapping operation on a region other than the separated first plurality of display objects on the touch panel display being detected,
causing the separated first plurality of display objects to be partially overlapped with each other, and
removing the device information image displayed on each of the separated predetermined shapes of the first plurality display objects, while the partially overlapped first plurality of display objects remain displayed.

15. The control method according to claim 1, wherein the device information image is a device image, which represents a corresponding one of the first plurality of devices, and
the device image is surrounded by a contour of a corresponding one of the predetermined shapes of the first plurality of display objects.

16. The control method according to claim 1, wherein the electric power information remains displayed after the separated first plurality of display objects are displayed in response to the first tapping operation.

17. A control method of an information device, comprising:
acquiring state information from a distribution board system via a network, the distribution board system including a plurality of branch circuits, including a first branch circuit of a first plurality of devices and a second branch circuit of a second plurality of devices, each of the first and second plurality of devices representing an electrical device, the state information indicating electric power consumption in each of the plurality of branch circuits;

displaying, on a touch panel display, a first interface of the distributing board system, the first interface comprising:
a partially overlapped first plurality of display objects representing the first branch circuit of the first devices, wherein each of the first plurality of display objects corresponds to one of the first devices of the first branch circuit, and each of the first plurality of display objects is displayed in a predetermined shape overlapping each other, with a portion of each of the first plurality of display objects being visible from the partially overlapped first plurality of display objects; and
first electric power information indicating first electric power consumption of the first branch circuit, displayed over the partially overlapped first plurality of display objects, such that the first electric power information is indicated for the first branch circuit;
in response to a first tapping operation on the partially overlapped first plurality of display objects being detected, causing the first interface to change to a second interface comprising:
the partially overlapped first plurality of display objects being separated by displaying a visible portion of each of the first plurality of display objects larger than the visible portion of each of the first plurality of display objects displayed in the first interface, and
first electric power information corresponding to the first plurality of display objects displayed at a location other than the separated first plurality of display objects; and,
a device information image representing one of the first plurality of devices displayed on each of the separated first plurality of display objects; and displaying, on the touch panel display, a third interface of the distribution board system, the third interface comprising:
a partially overlapped second plurality of display objects representing the second branch circuit of the second plurality of devices, wherein each of the second plurality of display objects corresponds to one of the second devices of the second branch circuit, and each of the second plurality of display objects is displayed in a predetermined shape overlapping each other, with a portion of each of the second plurality of display objects being visible from the partially overlapped second plurality of display objects; second electric power information indicating second electric power consumption of the second branch circuit, displayed over the partially overlapped second plurality of display objects, such that the second electric power information is indicated for the second branch circuit; and
in response to a third tapping operation on the partially overlapped second display objects being detected,
causing, the third interface to change to a fourth interface comprising:

the overlapped second plurality of display objects being separated bar displaying a visible portion of each of the second plurality of display objects larger than the visible portion of each of the second plurality of display objects displayed in the third interface, and first electric power information corresponding to the second plurality of display objects displayed at a location other than the separated second plurality of display objects; and a second device information image representing one of the second plurality of devices displayed on each of the separated second plurality of display objects;

in response to a second tapping operation on one of, the separated second plurality of being detected causing the displayed fourth interface to change back to the third interface.

18. A non-transitory computer-readable recording medium storing a computer program that causes a processor to execute operations including:

acquiring state information from a distribution board system via a network, the distribution board system including a plurality of branch circuits, including a first branch circuit of a first plurality of devices, the state information indicating electric power consumption in each of the plurality of branch circuits;

displaying, on a touch panel display, a first interface of the distributing board system, the first interface comprising:

a partially overlapped first plurality of display objects representing the first branch circuit of the first devices, wherein each of the first plurality of display objects corresponds to one of the first devices of the first branch circuit, and each of the first plurality of display objects is displayed in a predetermined shape overlapping each other, with a portion of each of the first plurality of display objects being visible from the partially overlapped first plurality of display objects; and first electric power information indicating first electric power consumption of the first branch circuit, displayed over the partially overlapped first plurality of display objects, such that the first electric power information is indicated for the first branch circuit;

in response to a first tapping operation on the partially overlapped first plurality of display objects being detected, causing the first interface to change to a second interface comprising:

the partially overlapped first plurality of display objects being separated by displaying a visible portion of each of the first plurality of display objects larger than the visible portion of each of the first plurality of display objects displayed in the first interface, and first electric power information corresponding to the first plurality of display objects displayed at a location other than the separated first plurality of display objects; and, a device information image representing one of the first plurality of devices displayed on each of the separated first plurality of display objects; and in response to a second tapping operation on one of the separated first plurality of display objects being detected, causing the displayed second interface to change back to the first interface.

19. An information device in which the recording medium according to claim 18 is loaded.

* * * * *

UNITED STATES PATENT AND TRADEMARK OFFICE
CERTIFICATE OF CORRECTION

PATENT NO. : 10,712,939 B2
APPLICATION NO. : 15/406833
DATED : July 14, 2020
INVENTOR(S) : Kumi Harada et al.

Page 1 of 1

It is certified that error appears in the above-identified patent and that said Letters Patent is hereby corrected as shown below:

On the Title Page

Column 1, after item (63), insert:
--(30)   Foreign Application Priority Data
Apr. 15, 2015 (JP) ........................ 2015-083296--

Signed and Sealed this
Twenty-second Day of September, 2020

Andrei Iancu
*Director of the United States Patent and Trademark Office*